US012794942B2

(12) United States Patent
Mautone et al.

(10) Patent No.: US 12,794,942 B2
(45) **Date of Patent: *Nov. 10, 2026**

(54) DISTRIBUTED ENDPOINT SECURITY ARCHITECTURE ENABLED BY ARTIFICIAL INTELLIGENCE

(71) Applicant: AADYA SECURITY, INC., Detroit, MI (US)

(72) Inventors: Raffaele Mauro-Aniello Mautone, Detroit, MI (US); Chad Sterling Priest, Detroit, MI (US)

(73) Assignee: AADYA SECURITY, INC., Detroit, MI (US)

( * ) Notice: Subject to any disclaimer, the term of this patent is extended or adjusted under 35 U.S.C. 154(b) by 85 days.

This patent is subject to a terminal disclaimer.

(21) Appl. No.: 18/917,112

(22) Filed: Oct. 16, 2024

(65) Prior Publication Data

US 2026/0106892 A1 Apr. 16, 2026

Related U.S. Application Data

(63) Continuation of application No. 18/009,926, filed as application No. PCT/US2021/038422 on Jun. 22, 2021, now Pat. No. 12,155,692.

(Continued)

(51) Int. Cl.
*H04L 9/40* (2022.01)

(52) U.S. Cl.
CPC ........ *H04L 63/1466* (2013.01); *H04L 63/083* (2013.01)

(58) Field of Classification Search
None
See application file for complete search history.

(56) References Cited

U.S. PATENT DOCUMENTS 6,643,784 B1 11/2003 McCulligh
7,975,297 B2 7/2011 Xavier et al.
(Continued)

FOREIGN PATENT DOCUMENTS

KR 1020080034929 A 4/2008
KR 1020190130730 A 11/2019

OTHER PUBLICATIONS

European Search Report for European Application No. EP21828679 dated Dec. 13, 2023.
(Continued)

*Primary Examiner* — Nelson S. Giddins

(57) ABSTRACT

A system for protecting an endpoint device of a user includes a web interface module that identifies a present URL visited by the user and target URLs to which navigation is available. A password management module installed on the endpoint device stores multiple entries. One entry includes a username, a password, and a login URL. The password management module selectively supplies credentials to the web interface module, including supplying the password to the web interface module in response to the web interface module identifying the login URL as the present URL. A URL analysis module evaluates the target URLs to classify each of the target URLs as either safe or suspicious and initiates a warning to the user in response to one of the target URLs being classified as suspicious. The URL analysis module performs the classification based in part on login URLs stored by the password management module.

20 Claims, 15 Drawing Sheets

Related U.S. Application Data

(60) Provisional application No. 63/042,523, filed on Jun. 22, 2020.

(56) References Cited

U.S. PATENT DOCUMENTS

| | | | |
|---|---|---|---|
| 9,774,623 B2 | 9/2017 | Xavier et al. | |
| 9,774,624 B2 | 9/2017 | Xavier et al. | |
| 10,069,865 B2 | 9/2018 | Xavier et al. | |
| 10,778,702 B1 * | 9/2020 | Huang | G06F 16/285 |
| 10,812,528 B2 | 10/2020 | Xavier et al. | |
| 11,570,211 B1 | 1/2023 | Liu | |
| 2011/0185412 A1 | 7/2011 | Crespo et al. | |
| 2017/0195310 A1 | 7/2017 | Tyler et al. | |
| 2018/0013790 A1 | 1/2018 | Xavier et al. | |
| 2020/0162484 A1 * | 5/2020 | Solis Agea | G06F 21/566 |
| 2020/0314122 A1 * | 10/2020 | Jones | G06N 3/0895 |
| 2021/0377301 A1 * | 12/2021 | Desai | G06F 21/577 |

OTHER PUBLICATIONS

Manuel Sanchez Paniaqua et al., “Impact of current phishing strategies in machine learning models for phishing detection”, ResearchGate, pp. 1-10, May 29, 2020.

International Search Report and Written Opinion of the ISA issued in PCT/US2021/038422, mailed Oct. 14, 2021; ISA/KR.

* cited by examiner

DISTRIBUTED ENDPOINT SECURITY ARCHITECTURE ENABLED BY ARTIFICIAL INTELLIGENCE

CROSS-REFERENCE TO RELATED APPLICATIONS

This application is a continuation of U.S. application Ser. No. 18/009,926 filed on Dec. 12, 2022 which is a U.S. National Phase Application under 35 U.S.C. 371 of International Application No. PCT/US2021/038422, filed Jun. 22, 2021, which claims the benefit of U.S. Provisional Application No. 63/042,523, filed Jun. 22, 2020. The entire disclosures of the above applications are incorporated herein by reference, the entire disclosure of which is incorporated by reference.

FIELD

The present disclosure relates to information security and more particularly to systems and methods of securing endpoint devices and online accounts access to buy those endpoint devices.

BACKGROUND

In the modern age, information security is very difficult. Many security experts believe that attackers have the advantage over defenders because attackers need only to succeed once in order to compromise a system, while defenders must succeed every time. While there is an almost limitless array of different attack vectors, two of the more common and therefore more disruptive are credential theft and malicious websites. In fact, there is some overlap between these two.

Credentials can be stolen in a number of ways, including keystroke logging and network monitoring of unsecured connections. Credentials may also be compromised due to password reuse or low-quality passwords. If a password is obtained from a breach of a first site and was used at a second site, the attacker will then have the credentials for the second site. The attacker may attempt to use credentials across a variety of websites using automated mechanisms, which is known as credential stuffing.

Passwords with low entropy (generally, short, dictionary-based passwords) can be guessed or brute-forced by an attacker. However, memorizing complex passwords for different sites is very difficult for most humans. As a result, poor password practices are the norm and lower the barriers to attackers. Password management products have been developed to maintain a database of passwords, which allows unique, high-complexity passwords to be used. However, password managers are not always easy to use and are generally even more difficult to configure initially.

Malicious websites may be created to mimic legitimate websites. If a user can be tricked into visiting one of the malicious websites, the website may prompt the user for credentials. Even if the user has a high-complexity password, once that password is provided to the malicious website, the password might as well have been "password1". Often, users are directed to malicious websites via links in emails, a process known as phishing. As a result, mail systems have been configured with anti-phishing features, which attempt to identify links to malicious websites and prevent the user from inadvertently accessing those malicious websites. However, anti-phishing software can experience false positives—misidentifying benign links as malicious—as well as false negatives—misidentifying malicious links as benign.

The above represent a tiny fraction of the reasons that securing computer systems is so difficult in the modern age. The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system for protecting an endpoint device of a user includes a web interface module installed on the endpoint device and configured to identify (i) a present uniform resource locator (URL) visited by the user and (ii) target URLs to which navigation is available. A password management module installed on the endpoint device is configured to store multiple entries. A first entry of the entries includes a first username, a first password, and a first login URL. The password management module selectively supplies credentials to the web interface module, including supplying the first password to the web interface module in response to the web interface module identifying the first login URL as the present URL. A URL analysis module configured to evaluate the target URLs to classify each of the target URLs as either safe or suspicious and to initiate a warning to the user in response to one of the target URLs being classified as suspicious. The URL analysis module performs the classification based in part on login URLs stored by the password management module.

In other features, the system includes an artificial intelligence engine configured to analyze speech received by a microphone of the endpoint device and identify a corresponding action based on the analyzed speech. In other features, the corresponding action is selected from at least one of a set of automated solutions configured to be executed on the endpoint device, a set of knowledge base articles configured to be displayed to the user, and generation of a service ticket. In other features, the artificial intelligence engine is configured to determine whether the analyzed speech corresponds to one of the set of automated solutions. The artificial intelligence engine is configured to, in response to determining that the analyzed speech does not correspond to one of the set of automated solutions, determine whether the analyzed speech corresponds to one of the set of knowledge base articles. The artificial intelligence engine is configured to, in response to determining that the analyzed speech does not correspond to one of the set of knowledge base articles, propose generation of the service ticket to the user.

In other features, at least some of the speech analysis is performed at a device physically remote from the endpoint device. In other features, the URL analysis module is configured to input a first target URL of the target URLs into a machine learning (ML) model and classify the first target URL as safe or suspicious based on an output of the ML model. In other features, the ML model is trained based at least on data that is specific to the user. In other features, data that is specific to the user includes the login URLs stored by the password management module. In other features, the web interface module is configured to select a first URL from a rendered web page of the present URL for provision to the URL analysis module as one of the target URLs.

In other features, the web interface module is configured to select a URL specified by a hyperlink as the first URL in response to a user indication of intent to activate the hyperlink. In other features, the web interface module is configured to interpret hovering a mouse cursor over the hyperlink as an indication of intent to activate the hyperlink. In other features, the web interface module is configured to identify a most visually prominent hyperlink from a rendered web page of the present URL and provide a URL within the most visually prominent hyperlink to the URL analysis module as one of the target URLs. In other features, the password management module is configured to, for a web service identified by the first login URL, programmatically update the first password using a change password function of the web service. In other features, the password management module is configured to programmatically update the first password using a headless browser executing on the endpoint device. The password management module is configured to programmatically update the first password in response to receiving a set password update flag. In other features, the password management module is configured to randomly generate a new password for a web service identified by the first login URL.

In other features, the password management module is configured to generate the new password based on a set of rules specific to the web service. The set of rules specifies at least one of minimum length of the new password, maximum length of the new password, acceptable characters for use in creating the new password, unacceptable characters for use in creating the new password, and required character sets for use in creating the new password. In other features, the system includes a data collection module configured to collect telemetry data about the endpoint device. The telemetry data includes a list of installed programs and a multiple metrics including memory usage and processor utilization. In other features, the web interface module comprises a plugin for a browser installed on the endpoint device. In other features, the URL analysis module is configured to input identifying information of a web page associated with a URL, and categorize the URL as one of multiple defined web pages based on an output of the ML model. The defined web pages include at least one of a login web page and a password update web page.

In other features, the above elements may be implemented as method steps in a computer-implemented process. In other features, the method steps may be encoded as processor-executable instructions in a non-transitory computer-readable medium. Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
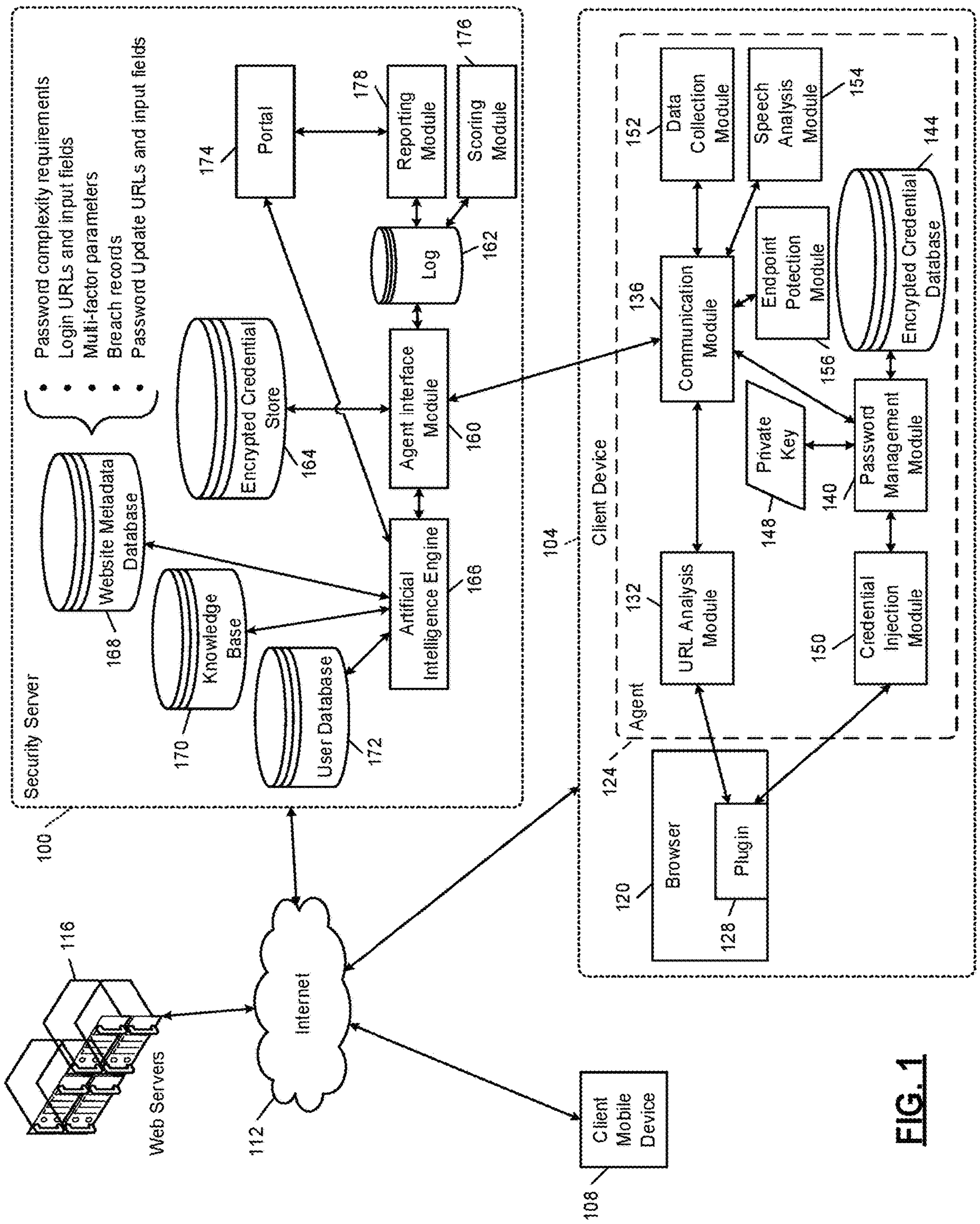
FIG. 1 is a functional block diagram of an example implementation of a security system according to the principles of the present disclosure.

The present disclosure describes a comprehensive cybersecurity and information technology (IT) solution, which may be offered through the software-as-a-service (SaaS) paradigm. The solution may be especially relevant to small and medium businesses, which lack the time, expertise, and human and monetary capital to successfully implement a robust cybersecurity solution. The disclosure describes a solution that, in various implementations, does not require dedicated IT or security personnel for a company to implement the security features or use them over time. The people responsible for the security features may therefore be referred to as "champions" rather than as "administrators."

Further, the present disclosure describes an integrated approach that allows businesspeople, without specialized IT assistance, to select an integrated solution rather than cobbling together existing products that may be partially or wholly incompatible. This integrated approach not only simplifies onboarding, management, and pricing, but may also offer significant security advantages as well.

For example, in implementations where the password manager is integrated with anti-phishing technology, a machine-learning (ML) model may have increased accuracy in detecting malicious links based on knowing the uniform resource locators (URLs) at which the user should be presenting credentials. In various implementations, an artificial intelligence (AI) engine may even engage with the user to explain why the link is malicious and help guide the user to the correct URL.

In another example, by combining device monitoring data with password management, the device monitoring data may be used to identify whether attempted access to a password manager repository is from an attacker, such as an entity that has cloned or stolen a laptop or smartphone from a user.

Each aspect of the present disclosure may be separately implemented as a microservice to allow for more rapid feature development and bug fixes. The AI engine may coordinate operation of others of the microservices, such as by providing login URLs from the password manager microservice to the anti-phishing URL analysis microservice.

On a user device, such as a laptop, smartphone, wearable device, or desktop computer, an agent can be installed that monitors and sends telemetry data to a central server. The central server may receive data from multiple companies and segregate that data logically and/or physically. In other implementations, the centralized server may be unique to a company and may be implemented in the cloud or on premises.

In addition to uploading telemetry data, the installed agent may be able to, through user interface (UI) automation, automate certain security tasks. For example, at the request of the user of the device or based on the heuristic judgment of the AI engine, the agent may be used to put the device to sleep, lock the device, shut the device down, lock the master password vault on the device, automatically update a password, sync passwords and settings between devices, etc.

The AI engine may also provide users with information about how to improve and maintain the security posture, and may even interactively guide them through various tasks step by step. Further, the AI engine may include speech recognition and natural image processing to allow for interaction with the user through voice control. The artificial intelligence engine may be triggered by a wake phrase, such as "hey Judy."

Any speech following the wake phrase may be analyzed locally and/or sent to a remote system for analysis. In various implementations, the speech may be compressed, such as by transforming time-series speech data into phonemes, before being sent to the remote system. As described in more detail below, the processed speech may be analyzed by the AI engine to determine whether the request can be serviced automatically or whether a knowledge base article exists to assist the user with the request. Further, the AI engine may assist the user in generating a support ticket if other resources are unavailable or ineffective. In various implementations, an Internet connection may be required for use of the security system, which may not serve as a practical limitation because the security features are most relevant when that Internet connection exists.

In some implementations, the server and/or the installed agent of the security system can update passwords using a change password function of a website. For example, the server and/or the installed agent may update a user's password if a defined event occurs. For instance, the user's password may be updated if a website breach is detected, the password is used for an extended period of time, the password is used for multiple sites, etc. Additionally, the server and/or the installed agent may utilize a headless browser to update passwords based on collected metadata for a password update page. In such implementations, passwords may be updated without user interaction.

The server and/or the installed agent may also calculate a security score based on a variety of factors for each user. In various implementations, the factors include whether the firewall on the user device is enabled, what firewall exceptions are present, whether second factors such as biometrics are required for use of the device, whether newer versions of any installed applications or drivers are available, what the screen lock timeouts are, password complexity and extent of password reuse, etc. The scores may be normalized across a company or across industry or even across all companies being serviced by the security system.

The scores can be used by individual users as an indication of the efforts needed for their security. This score is used as an input to an optional gamification system, which rewards users with badges and score increases for performing security-related tasks. Further, if desired by the company, competitive features, such as a leaderboard of the N most secure users at the company may be enabled. For example, N may be set according to a certain percentage of the total users at the company, such as 5%.

Further, security scores could be used by management of the company to identify users for encouragement and training in order to raise their scores and enhance security across the business. One or more champions may be designated for the company while perhaps not being information technology professionals, the champions may have performed video or web-based training to understand security nomenclature. The champions can assist their fellow users in improving their security scores. Further, the champions may have a dashboard through which they can add or remove users and perform other illustrative tasks. These champions may receive reports on a periodic basis and when any salient event occurs, such as a security score of a user falling below a threshold. These reports can be reviewed by the champion for determining areas of improvement for individuals and the company.

Block Diagram

In FIG. 1, a security server 100 according to the principles of the present disclosure is shown. While referred to as a singular server, the security server 100 may be implemented with one or more physical or virtual servers, or may be implemented as one or more microservices, one or more containers, and/or one or more virtual machines.

The security server 100 may be associated with a security system offered to customers. For example, the security system may be implemented using a software-as-a-service (SaaS) model. In various implementations, a customer may be a business with one or more associated users. As examples, a client device 104 and a client mobile device 108 for the same user or different users are depicted in FIG. 1. As such, a single user or multiple users may have one or more devices and each can communicate with the security server 100 via the Internet 112.

Interactions by the client device 104 and the client mobile device 108 with web servers 116 can be secured by the security system, including the security server 100. Web servers 116 may be as diverse as productivity services like OFFICE 365 from Microsoft Corp., email systems like GMAIL from Google LLC, source code control systems such as the BITBUCKET version control system from Atlassian Corp., and entertainment systems such as the NETFLIX streaming service from Netflix, Inc.

The client device 104 may be a personal computer, such as a laptop or desktop computer. The client device 104 includes a browser 120, such as the CHROME browser from Google LLC. As part of onboarding the client device 104 to the security system, an agent 124 is installed on the client device 104. Further, a web interface module allows the agent 124 to communicate with the web servers 116. In example FIG. 1, the web interface module takes the form of a plugin 128 to the browser 120. In systems with more than one web browser, respective plugins may be present for each browser.

In various implementations, the web interface module may be implemented as a custom browser, which may be based on the CHROMIUM open source browsing platform. A custom browser may be used when a plugin is not available. For example, on some operating systems, browser plugins are not permitted and so a separate browser may be used that incorporates the functionality of the plugin 128. In various implementations, the agent 124 may instead take the form of a native application or a web application.

The agent 124 includes a uniform resource locator (URL) analysis module 132 that, as described in more detail below, analyzes URLs to be loaded by the browser 120. The plugin 128 provides these URLs to the URL analysis module 132 and the plugin 128 permits and/or denies access to the URL based on analysis performed by the URL analysis module 132.

The URL analysis module 132 may implement a ML model that is at least partially trained on login URLs that the user visits over a period of time. For a target URL, the feature vector supplied to the ML model may include features such as: parameters of the target URL itself, such as length and presence of non-alphanumeric characters; redirection properties of the URL; indexing status and rank in one or more search engines; and data obtained from navigating to the URL in a headless browser, such as the presence of form fields, especially those designated for password entry, generation of popups, presence of a favicon, etc. The ML model may be periodically (for example, daily) retrained based on anonymized URLs visited by users of the security system.

URLs visited by users may be identified and categorized by the URL analysis module 132 and/or the security server 100. For example, when the user of the client device 104 lands on a particular page, the URL analysis module 132 may collect and analyze data to determine the type of page visited by the user. In some examples, the module 132 may obtain and scrape a document object module (DOM) to collect data relating to page features (e.g., named input fields, etc.) associated with the visited webpage. This information may be used to create feature vectors for one or more ML modules in the agent 124 and/or the security server 100 that are trained on the visited URLs. The URL analysis module 132 and/or the security server 100 may use the collected data to identity and categorize URLs. For example, the URLs may be categorized as a variety of different pages such as a login page, a password update page, a password reset page, or an unknown page.

Once a URL is categorized as a particular type of page, metadata of the associated page may be collected and stored each time a user employing the security system visits that page. For example, if the user of the client device 104 visits a page for the first time, the associated URL may be categorized as a particular type of page (e.g., a login page). During the page visit, the URL analysis module 132 and/or the security server 100 may capture and store metadata may according to the page's categorization. If the user of the client device 104 (and/or another user employing the security system) later visits that same page, the associated URL may be recognized and metadata of the page may be captured and stored again if desired. This creates a crowd-sourced collection of data.

In various implementations, the plugin 128 may display a capture page indicating to the user that a URL is being analyzed for the user's protection. In some examples, the plugin 128 may provide access to any URLs not verified by the URL analysis module 132. In other examples, the plugin 128 may provide access to only the URLs verified by the URL analysis module 132.

In some implementations, the plugin 128 may provide the URL to the URL analysis module 132 in advance of a user selecting that URL, such as information suggesting that a URL may be selected. For example, the plugin 128 may provide the URL when the user hovers the mouse cursor over a particular URL. Or, if the user is using a keyboard and has tabbed over to a particular URL, that URL may be provided by the plugin 128 to the URL analysis module 132. Finally, when a user first navigates to a new page, if a particular hyperlink is more visually prominent than others, the plugin 128 may speculatively provide the URL from that hyperlink to the URL analysis module 132. The plugin 128 may assess that a hyperlink is visually prominent if its font size is greater than other hyperlinks and that, as the page is rendered, the hyperlink is displayed centrally on the device screen rather than on the periphery or even off-screen.

The URL analysis module 132 may perform an analysis itself or may offload some or all of the analysis to the security server 100 via a communication module 136. When offloading some or all analysis, the URL analysis module 132 may maintain a cache of common URLs to reduce latency and conserve network bandwidth.

A password management module 140 tracks passwords and other credentials for the user. These credentials are stored in an encrypted credential database 144. A private key 148 may be used by the data management module 140 to decrypt entries in the encrypted credential database 144 as needed. The private key 148 is not shared with the security server 100. In various implementations, the private key 148 may need to be entered by the user into the client device 104 and/or may be combined with a master password provided by the user of the client device 104.

The password management module 140 may have a graphical user interface (GUI) accessible to the user of the client device 104. For example, the user may request that the password management module 140 update a password via the GUI. In other examples, the user may also use the GUI to select a site for login.

For example, in response to the user selecting a site for login with the GUI, the password management module 140 may retrieve the corresponding login URL. The password management module 140 may then instruct a credential injection module 150 to provide the login URL to the plugin 128, where the plugin 128 causes the browser 120 to navigate to the login URL. The password management module 140 can then supply the credentials for the login URL through the credential injection module 150 to the plugin 128. The plugin 128 may enter the credentials into the login form and automatically submit the form. In this way, logging into a website may be automated such that authentication to the password management module 140 is the only authentication needed for the user. This allows for single sign-on without requiring that every website the user visits supports a technology for single sign-on, such as security assertion markup language (SAML).

The password management module 140 may be able to perform automated tasks for the user without even using the browser 120. For example, the password management module 140 may use a headless browser to navigate to a website of interest and perform a password modification routine. This routine may include, for example, logging into the website (e.g., at a login page), navigating to a password update page associated with the website, generating a new password, submitting a newly generated password for the website, etc. The password modification routine may be performed at the request of a user, at the request of the champion associated with the user, and/or programmatically in response to an event such as a breach of that website and potential release of passwords (or their hashes), an elapsed period of time, a determination of matching passwords, etc.

The password management module 140 may supply an encrypted object (sometimes referred to as a blob) of the encrypted credential database 144 to the security server 100 for backup purposes and for synchronization with other devices, such as the client mobile device 108. Because the private key 148 does not leave the client device 104; even if an attacker intercepts or acquires the encrypted credential database 144, no use can be made of it. Further, this assures the user that the security server 100 will not provide access to the user's passwords to an operator of the security server 100 or to other members of the user's company.

The password management module 140 may receive stored metadata about a website by the communication module 136. For example, information about a login URL for a website enables the password management module 140 to navigate directly to a login page for a website. Having a login URL also ensures that the user does not inadvertently navigate to a malicious page masquerading as the legitimate website.

The password management module 140 may include a password generator to develop strong passwords for each website. However, because each website may have different password complexity requirements and different password length limits, there is no single recipe for generating a strong password across every website. Therefore, password complexity requirements may be obtained by the password management module 140, such as from the security server 100. Password complexity requirements may indicate whether characters other than alphanumeric characters are required and which non-alphanumeric characters are permitted. Further, the password complexity requirements may include minimum and maximum permitted lengths.

A data collection module 152 collects data about the client device 104, including networking information such as Internet Protocol (IP) addresses, medium access control (MAC) addresses, domain name system (DNS) addresses, etc. The data collection module 152 may also collect information about version numbers of installed applications and drivers. In addition, the data collection model 152 may collect other information such as memory usage, processor utilization, running services, firewall settings, antivirus settings, etc. This data may be provided by the security server 100 via the communication module 136.

The client device 104 includes a speech analysis module 154 that allows the user to communicate with the agent 124 and the security server 100 via voice. In various implementations, analysis of the voice may be bifurcated between the speech analysis module 154 and the security server 100. For example, the speech analysis module 154 may identify a wake phrase and then transmit subsequent speech to the security server 100 for analysis. In various implementations, an AI engine may exist within the security server 100 and/or within the client device 104 for processing and responding to user speech.

In various implementations, the agent 124 also includes an endpoint protection module 156. The endpoint protection module 156 scans files of the client device 104 to detect potential malicious files. For example, the endpoint protection module 156 may obtain a list of signatures from the communication module 136 against which files can be compared. As described below, files that may be malicious can be quarantined and deleted.

In various implementations, every component of the agent 124 of the security server 100 may be able to communicate with the user via voice. The speech analysis module 154 receives the user's voice and the speech synthesis module (not shown) generates spoken speech to the user. For example, the spoken voice may include notifications of malicious files being found by the endpoint protection module 156 or the successful updating of a password by the password management module 140.

Example functional blocks of the security server 100 include an agent interface module 160 that communicates with the communication module 136 of each of the devices, including the client device 104 and the client mobile device 108. In various implementations, due to the divergence in operating systems between mobile devices, wearable devices, personal computers, etc. the functionality implemented by the agent 124 and the plugin 128 may be implemented differently on different devices. For example, the agent 124 may take the form of a native application installed from a digital distribution platform such as the APP STORE by Apple Inc. when the climate device 108 is running the iOS operating system.

The agent interface module 160 is responsible for creating an encrypted channel with the communication module 136, which may include the use of a hypertext transfer protocol secured (HTTPS) connection. A log database 162 logs information about the client device 104, including data retrieved from the data collection module 152. A copy of the encrypted credential database 144 is stored into an encrypted credential store 164 and can then be synced to other devices under control by the same user. As such, a copy of the encrypted credential database 144 may be distributed to the client mobile device 108.

An artificial intelligence (AI) engine 166 may operate in response to speech, such as that received by the speech analysis module 154. For example, the AI engine 166 may be triggered by a wake phrase, such as "hey Judy," received by the speech analysis module 154. Additionally, the AI engine 166 may analyze speech data from the speech analysis module 154, and respond based on the analyzed speech data to allow for interaction with the user. In some examples, the speech data may relate to a request (e.g., a user request). The AI engine 166 may analyze the date (request), and determine whether the request can be serviced automatically or whether a knowledge base article exists to assist the user with the request.

The AI engine 166 may also gather website metadata for storage in a website metadata database 168 when, for example, the user visits a webpage as explained herein. This metadata may include, as examples, password complexity requirements, login URLs, multifactor authentication parameters, and breach records. For example, a breach record may include the date of a breach; any passwords used at that site on or before that date may be considered potentially compromised.

In various implementations, some or all of the data in the website metadata database 168 may be cached in the client device 104—in some cases, in a data store maintained by the agent 124. For example only, some or all of the metadata of a defined number of most-frequently-visited sites may be cached. In addition, some or all of the metadata of sites visited by the client device 104 may be cached. The cache may be updated each time a site is visited or may be updated on a periodic basis (such as nightly). Additionally or alternatively, metadata for a site may be updated based on an indicator of freshness—such as when data has been cached for 7 or more days.

Multifactor parameters may indicate whether multifactor authentication, such as text messages or time-based one-time password (TOTP) codes are available. When available, multifactor authentication may enhance security, so their use may increase a user's security score. Further, login URLs may be acquired over time, as there may be more than one URL that permits login to a given web service.

Password capacity requirements may be manually entered, especially for the most common web properties such as the top 500 sites determined by Alexa. Even without manual entry, the AI engine 166 may collect metadata about passwords used on websites to begin inferring password complexity requirements. For example, if a password that permits login to the website incorporates a special character such as the at symbol (@), the AI engine 166 may infer that the at symbol is permitted for the website. Further, as a large number of passwords is generated for a website, the distribution of lengths of the passwords begin to indicate what lengths are acceptable to the website. This metadata is anonymized so that no individual user's password is associated with metadata such as length, symbols used, etc.

A knowledge base 170 includes knowledge base articles that can simply be read by a user. Further, the knowledge base 170 may include interactive guides that allow the AI engine 166 to walk the user through a process one step at a time. In addition, the knowledge base 170 may include automated routines for performing certain tasks. For example, an automated routine for resetting a device's network settings may be performed at the user's request but without further interaction by the user.

A user database 172 maintains information about which users are associated with security server 100 and what company policies are relevant to the user. The user database 172 may allow one or more administrators to be defined for a company. However, these users may not have IT credentials and may therefore be referred to as champions rather than administrators. This emphasizes that they are champions of security in the company but do not have to worry about the minutiae of information security. Instead, the security system will handle that for them.

The user database 172 may also include credentials allowing the user to authenticate to the security server 100. For example, a portal 174 may take the form of a website that the user of the client device 104 can log into using the single sign-on functionality of the password management module 140. To authenticate the user, the portal 174 consults the user database 172 either directly or through the AI engine 166.

A scoring module 176 may periodically, or on an event-driven basis, calculate scores for users. The scores may be stored into the log database 162 so that historical trends of scores can be reported. For example, a reporting module 178 may generate reports for display on the portal 174 and/or for provision to certain users by other mechanisms, such as email.

Flow and Sequence Charts

Figure 2:
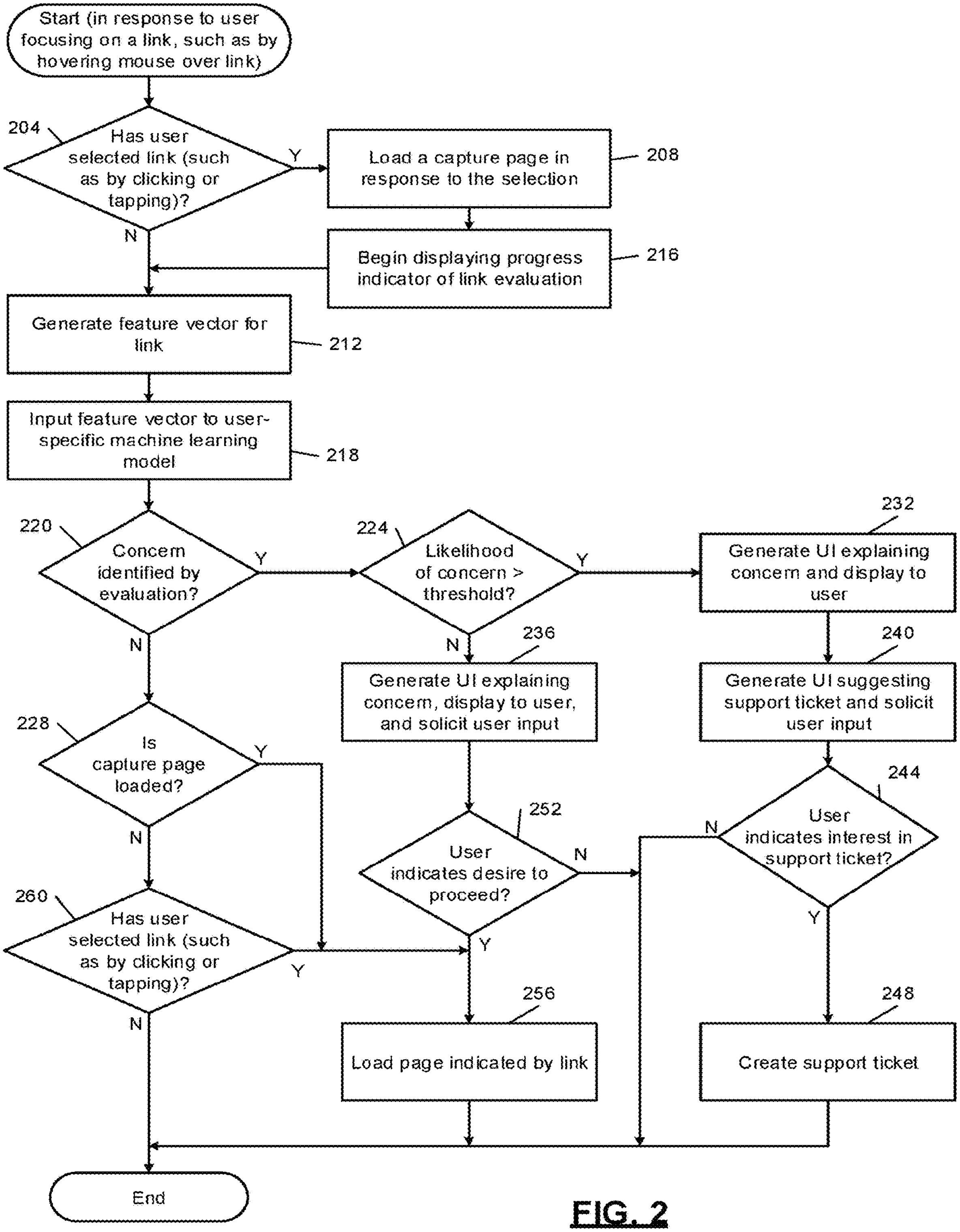
FIG. 2 is a flowchart of an example method of uniform resource locator (URL) analysis.

In FIG. 2, an example anti-phishing operation is shown and begins when a target link is identified. For example, the user may focus on the link by hovering the mouse pointer over the link or by tabbing through a web document to arrive at a link. In other implementations, a target link may be identified based on its prominence on the current page. Control begins at 204, where control determines whether the user has yet selected the link, such as by clicking or tapping the link. If so, control transfers to 208; otherwise, control transfers to 212.

At 208, control loads a capture page in response to the selection. The capture page indicates to the user that the selected link is being examined for security purposes. Control continues at 216, where control begins displaying a progress indicator of link evaluation. The progress indicator may suggest how long the process will take. In other implementations, the progress indicator may simply indicate that progress is occurring so the user does not question why the link is not yet been followed. Control then continues at 212.

At 212, control generates a feature vector for the link. For example, the feature vector may include the domain of the link, the full URL of the link, the type of protocol (such as ftp, http, or https), and the referrer URL. The feature vector may also include one or more user-specific features, such as a count of previous visits to the domain.

At 218, control evaluates the target link. For example, control may input the feature vector to a user-specific machine learning model. User-specific means that, for example, the machine learning model has been at least partially trained on data specific to the user, such as which websites the user has visited and authenticated to.

At 220, control determines whether a concern about the link was identified by the evaluation. If so, control transfers to 224; otherwise, control transfers to 228. At 224, control determines whether a likelihood of concern is greater than a threshold. For example, the threshold may be set to differentiate between links that are blacklisted (e.g., blocked) and links that pose a possible security threat. If so at 224, such as when the link is blacklisted, control transfers to 232; otherwise, control transfers to 236.

At 232, control explains the concern to the user. For example, control may generate a user interface (UI) dialog providing an explanation of why the link is known to be malicious. This UI dialog may be based on a template, with concern-specific text and site-specific text. At 240, control may suggest the availability of a support ticket if the user believes that the link has been inaccurately blocked. At 244, control receives user input and determines whether that input indicates interest in a support ticket. If so, control transfers to 248; otherwise, control ends.

At 236, control explains the concern with the link to the user and may give the user the opportunity to proceed. At 252, control accepts user input and determines whether the user input indicates a desire to proceed to the target link. If the desire is to proceed, control transfers to 256; otherwise, control ends. At 256, control loads the page indicated by the link and control ends.

At 228, control determines whether the capture page is loaded. If so (e.g., the process indicates the link has already been selected), control transfers to 256 to load the page. Otherwise, control transfers to 260. At 260, control determines whether the user has selected the link since the check was performed at 204. If the user has selected the link in the interim, control transfers to 256; otherwise, control ends.

In various implementations, evaluating the link may include navigating to the link in a headless browser on either the client device or a security server. However, for certain classes of link, such as password reset links, this step may be omitted to prevent the password reset link from being inactive once the pages actually load on the user device.

Figure 3A:
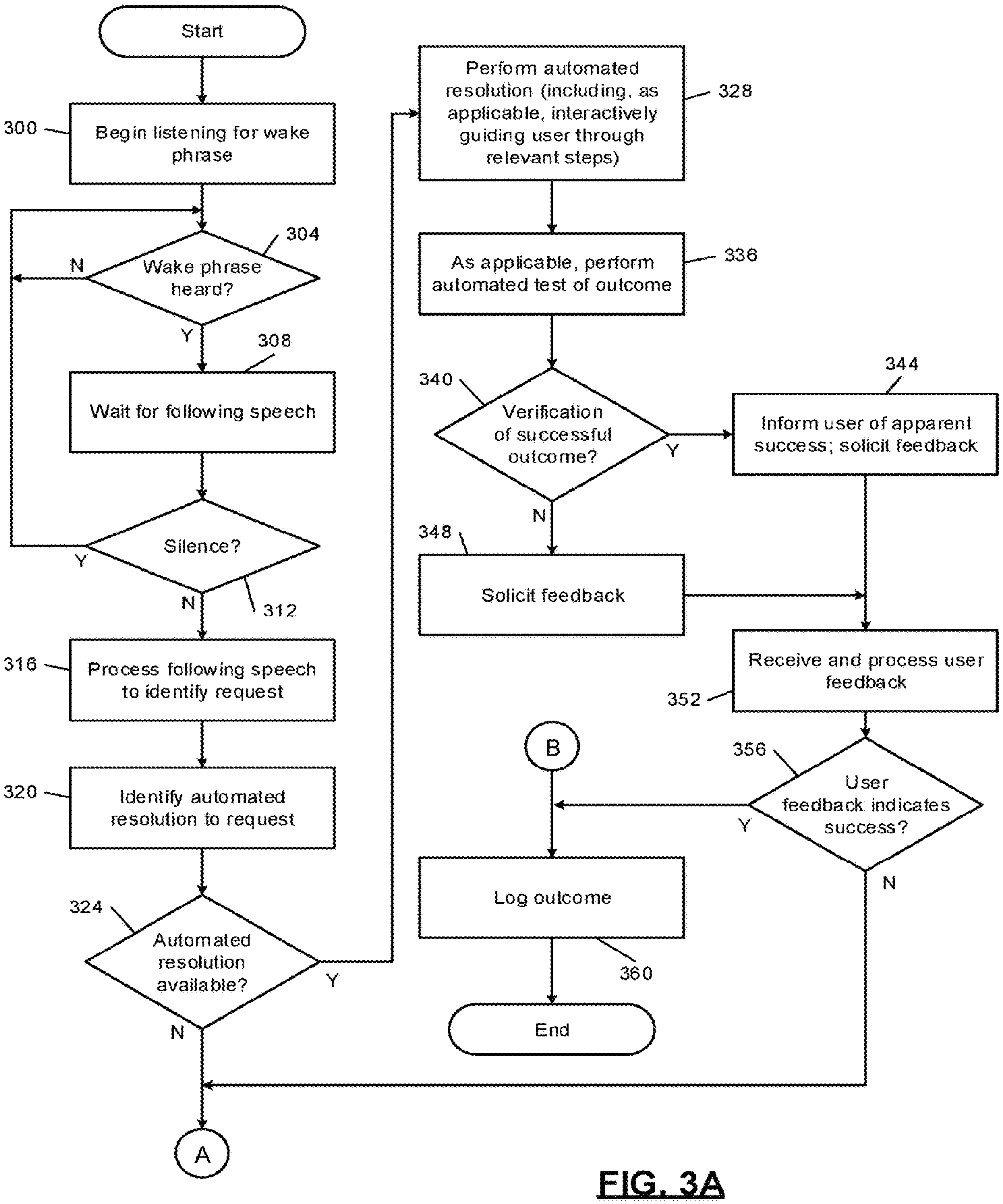
FIGS. 3A and 3B together are a flowchart of example operation of an artificial intelligence engine.
Figure 3B:
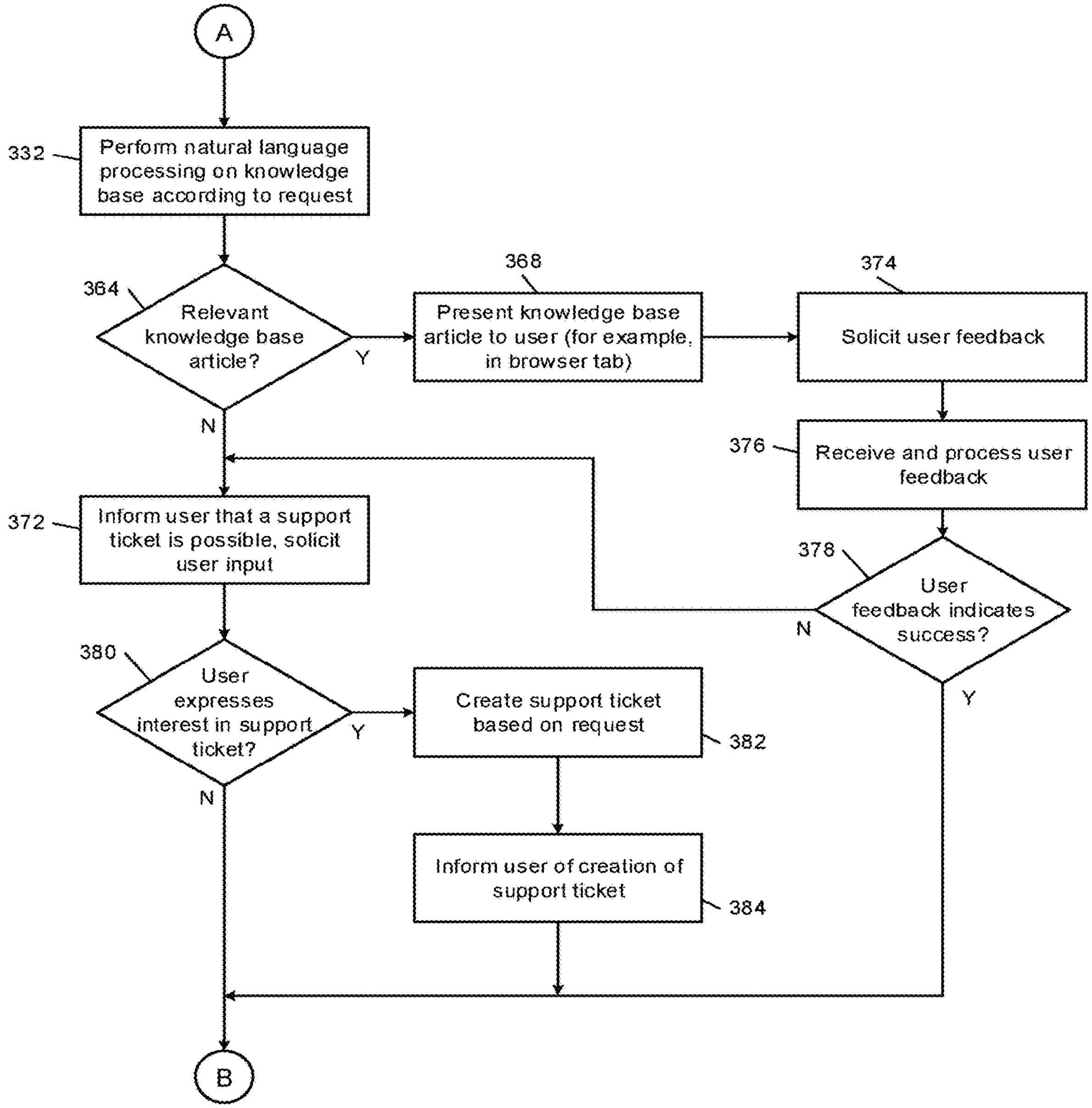

In FIGS. 3A and 3B, example operation of natural language interaction for an artificial intelligence engine is shown. Control begins at 300, where control begins listening for the wake phrase. At 304, control determines whether the wake phrase has been heard and recognized. If so, control transfers to 308; otherwise, control remains in 304. At 308, control waits for the following speech to be recorded. In various implementations, control may begin processing the speech as the user is speaking while in other implementations control simply records the speech.

At 312, control determines whether only silence or background noise was heard for a defined time period following detection of the wake phrase. If so, control returns to 304. However, if some audio data that may be speech was captured, control transfers to 316. At 316, control processes the following speech to identify the request made by the user. At 320, control identifies whether there is any automated resolution defined for the request. If there are multiple automated resolutions available, control may select the most likely one based on the closeness of the match to the request. At 324, control continues at 328 if an automated resolution is available and transfers to 332 of FIG. 3B if no automated resolution is available.

At 328, control initiates the automated resolution. For example, this automated resolution may include backend work that can be performed by a security server such as the security server 100 of FIG. 1. For automated resolutions, steps may be performed on the user's device. For example, user interface (UI) automation and/or direct application programming interface (API) calls to an operating system may be made to perform steps on the user device, such as resetting wireless network settings.

If the automated resolution involves one or more user steps, an interactive mode may convey the necessary steps to the user. For example, if a restart of the device is needed, an artificial intelligence engine may indicate to the user that the device will restart and request that the user authenticate to the device so that the automated process can continue. At 336, control performs an automated test of the outcome if applicable. For example, the automated test may include attempting to connect to a particular website. In other implementations, the automated test may involve checking for available memory. As yet another automated test, control may check whether the operating system's firewall has been enabled.

At 340, if a successful outcome has been verified, control transfers to 344; otherwise, control transfers to 348. At 344, control informs the user of the apparent success and solicits feedback. Control then continues at 352. At 348, control solicits feedback. This may include indicating to the user that a successful outcome cannot be verified. Control then continues at 352. At 352, control receives and processes the user feedback. At 356, control determines whether the user feedback indicates a successful outcome from the user's perspective. If so, control transfers to 360; otherwise, control continues at 332 of FIG. 3B. At 360, control logs the outcome and ends.

At 332 of FIG. 3B, control performs natural image processing on the knowledge base according to the request to identify one or more relevant knowledge base articles. At 364, control determines whether there is a relevant knowledge base article corresponding to the user request. If so, control transfers to 368; otherwise, control transfers to 372. At 368, control presents the most relevant knowledge base article to the user, such as by opening a local or remote hypertext markup language (HTML) page in a tab of the user's web browser. Control then solicits feedback from the user at 374, and receives and processes the user feedback at 376. At 378, control determines whether the user feedback indicated a successful resolution based on the knowledge base article. If the user feedback indicates success, control returns to 360 of FIG. 3A; otherwise, control transfers to 372.

At 372, control informs the user that a support ticket is possible. In some implementations, control optionally informs the user that an artificial intelligence engine can assist in creating the support ticket to address the user's request. At 380, control determines whether the user has expressed an interest in the support ticket. If so, control transfers to 382; otherwise, control returns to 360 of FIG. 3A. At 382, control creates a support ticket based on the request. The support ticket may be for a champion of the organization and/or may be a support ticket for a helpdesk system, such as from a managed service provider. At 384, control informs the user of the creation of the support ticket and continues at 360 of FIG. 3A.

Figure 4A:
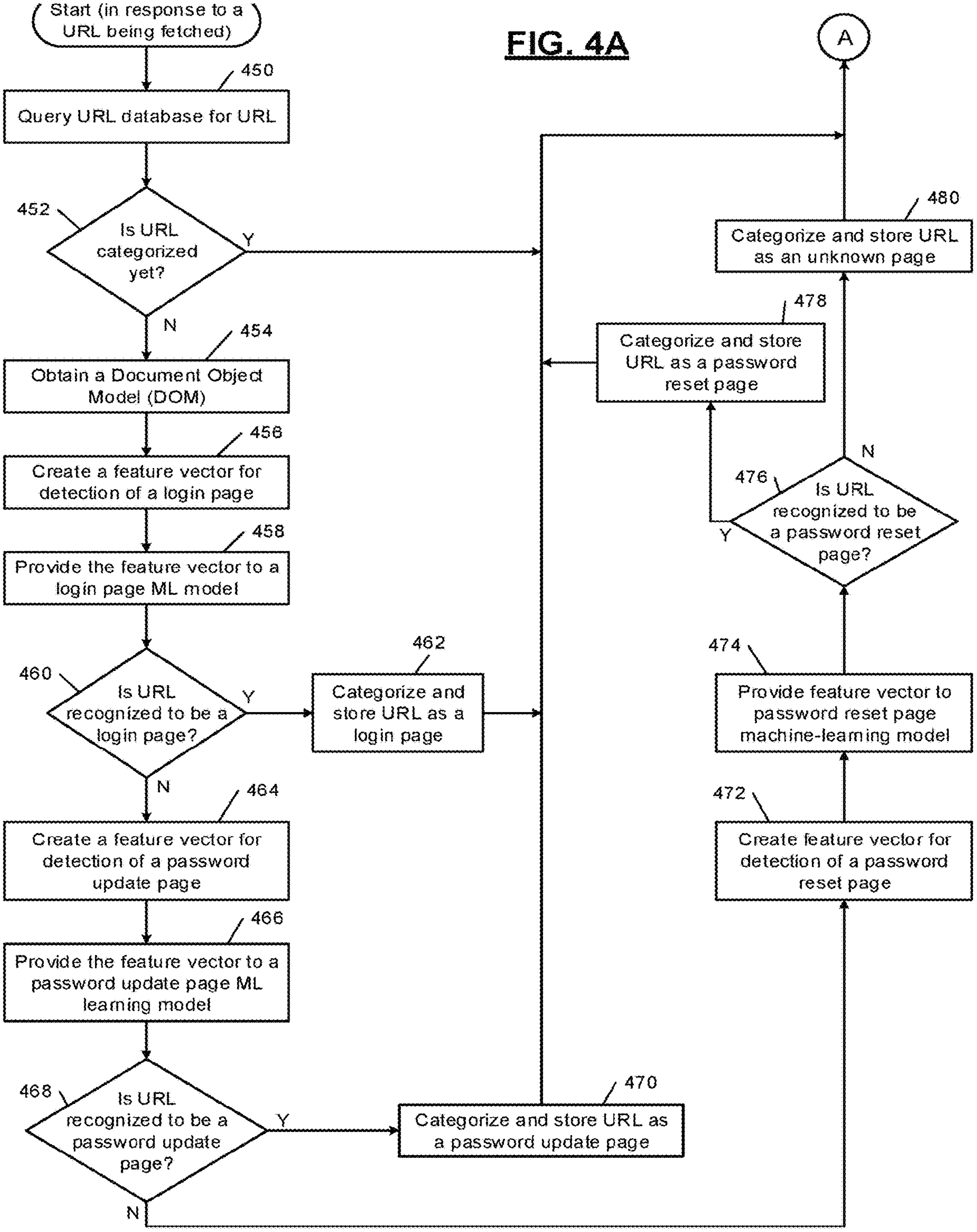
FIGS. 4A and 4B together are a flowchart of example URL categorization and metadata collection.
Figure 4B:
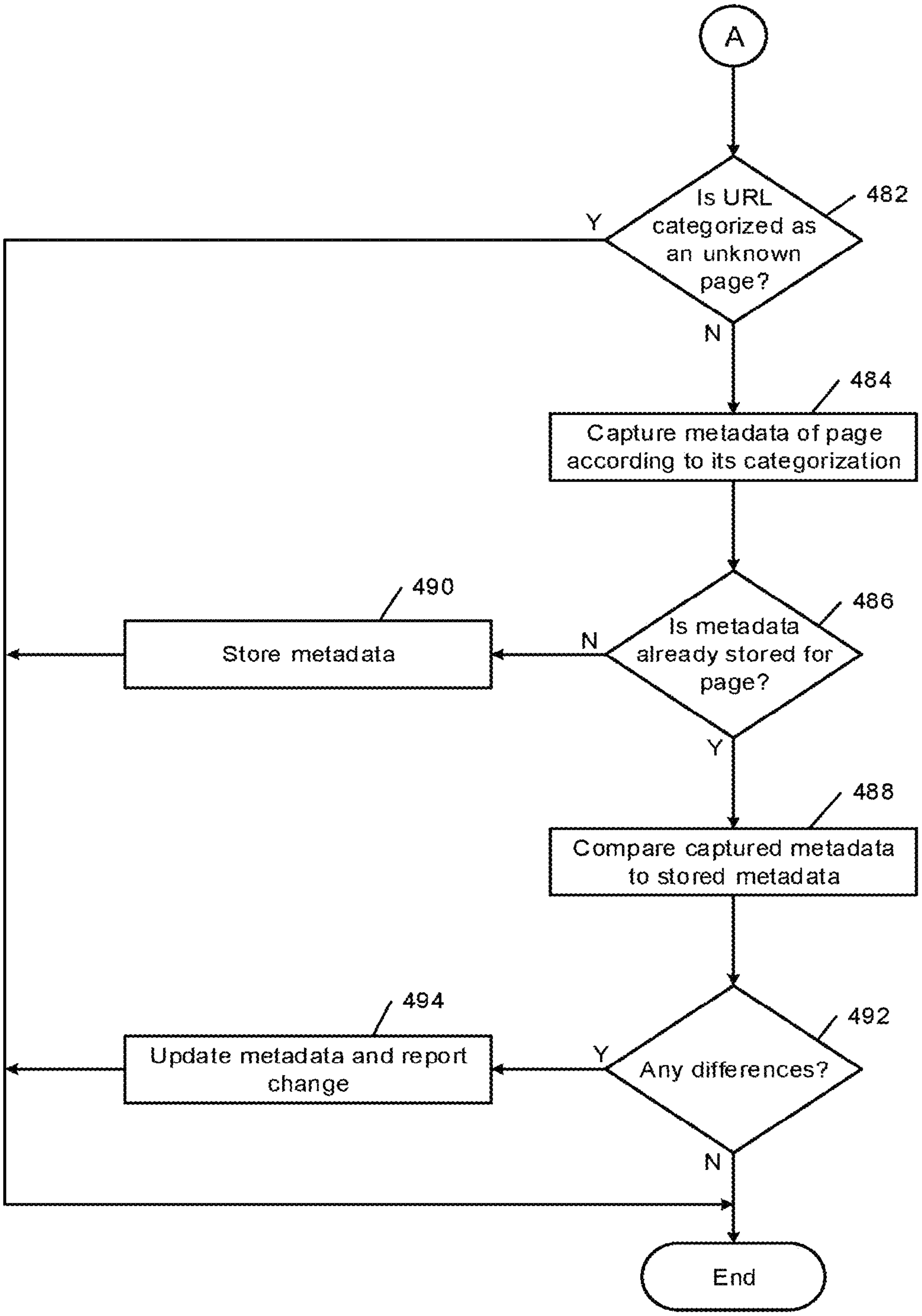

FIGS. 4A and 4B show example operation of URL categorization and metadata collection. In the example operation of FIGS. 4A and 4B, each fetched URL is categorized as a login page, a password update page, a password reset page, or an unknown page. In other examples, the fetched URLs may be categorized in another suitable manner if desired. Additionally, portions of or the entire example operation of FIGS. 4A and 4B may be implemented on a client device such as the client device 104 of FIG. 1 or a security server such as the security server 100 of FIG. 1.

In FIGS. 4A and 4B, control begins in response to a URL being fetched. At 450 of FIG. 4A, control queries a URL database for the fetched URL. The URL database may be a portion of the website metadata database 168 of FIG. 1 and/or a separate database associated with the server 100. At 452, control determines if the fetched URL has been categorized. This may be accomplished by determining whether the fetched URL is stored in the URL database. For example, control may compare the fetched URL with the categorized URLs stored in the URL database. If the URL has been categorized, control transfers to 482 of FIG. 4B; otherwise, control transfers to 454 of FIG. 4A.

At 454, control obtains a DOM for the page associated with the fetched URL. Control then creates a feature vector for detection of a login page at 456, and provides the created feature vector to a login page ML model at 458. For example, control may scrape the DOM for data (e.g., particular fields, key words, etc.) relating to the particular type of page associated with the URL, and create the feature vector based on the collected data.

Control continues at 460, where control determines whether the URL is a login page. This login page detection may occur based on an output of the login page ML model. If so, control transfers to 462; otherwise, control transfers to 464. At 462, control categorizes and stores the URL as a login page. Control then continues to 482 of FIG. 4B. For example, control may store the categorized URL as a login page in the website metadata database 168 of FIG. 1, a database of the client device 104 of FIG. 1, etc.

At 464, control creates a feature vector for password update page detection. This feature vector may be created based on the collected data from the DOM, as explained above. Control then continues to 466, where control provides the created feature vector to a password update page ML model.

Control continues at 468, where control determines whether the URL is a password update page based on, for example, an output of the password update page ML model. If so, control transfers to 470; otherwise, control transfers to 472. At 470, control categorizes and stores the URL as a password update page in the website metadata database 168 of FIG. 1, a database of the client device 104 of FIG. 1, etc. Control then continues to 482 of FIG. 4B.

At 472 of FIG. 4A, control creates a feature vector for password reset page detection based on, for example, the collected data from the DOM, as explained above. Control then continues to 474, where control provides the created feature vector to a password reset page ML model.

Control continues at 476, where control determines whether the URL is a password reset page based on, for example, an output of the password reset page ML model. If the URL is a password reset page, control categorizes and stores (e.g., in the website metadata database 168 of FIG. 1, a database of the client device 104 of FIG. 1, etc.) the URL as a password reset page at 478 and proceeds to 482 of FIG. 4B. If the URL is not a password reset page, control categorizes and stores the URL as an unknown page at 480 and proceeds to 482 of FIG. 4B.

At 482 of FIG. 4B, control determines whether the fetched URL is categorized as an unknown page. To make this determination, control may compare the fetched URL with the stored URLs categorized as unknown pages. If the fetched URL is categorized as an unknown page, control ends. Otherwise, control captures metadata of the page associated with the URL according to its categorization at 484. For example, if the page is categorized as a login page, control may capture information (e.g., locations, names, etc.) relating to login form fields such as a username field, a password field, a submit input field, a password update input field, a password reset input field, etc. If the page is categorized as a password update page, control may capture information relating to update form fields such as a username field, a user's email address field, an update password field, a submit input field, etc. If the page is categorized as a password reset page, control may capture information relating to reset form fields such as a user's email address field, a username field, an existing password field, a submit input field, etc. In some examples, control may capture information relating to password requirements for the particular website such as length (minimum and/or maximum), special character, and/or capitalization requirements if the requirements are provided on the page.

Control continues at 486, where control determines whether any of the captured metadata is already stored for that page. If the metadata is already stored, control transfers to 488. Otherwise, control stores the captured metadata at 490, and ends. At 488, control compares the captured metadata and the stored metadata. For example, control may compare locations, names, etc. of fields from the captured metadata to those of the stored metadata. Control then continues to 492.

At 492, control determines whether any differences exist between the captured metadata and the stored metadata. If so, control transfers to 494; otherwise, control ends. At 494, control updates the stored metadata based on the captured metadata and creates a report for any change in the stored metadata. The storing of metadata and/or the updating of stored metadata may occur in multiple locations. For example, metadata may be locally stored and/or updated on a client device (e.g., the client device 104 of FIG. 1). Additionally and/or alternatively, metadata may be remotely stored and/or updated on a server (e.g., in the website metadata database 168 associated with the server 100 of FIG. 1).

The capturing and updating of metadata occurs each time any one of the users employing the security system visits a categorized page. As such, if an input field is modified (e.g., added, removed, changed, etc.) and/or if an input field was excluded, mischaracterized, etc. from a previous metadata capture, control may update the stored metadata accordingly. This creates a crowdsourced collection of data for the categorized pages such that future actions taken based on the stored metadata for a particular categorized page may become more reliable.

Figure 4C:
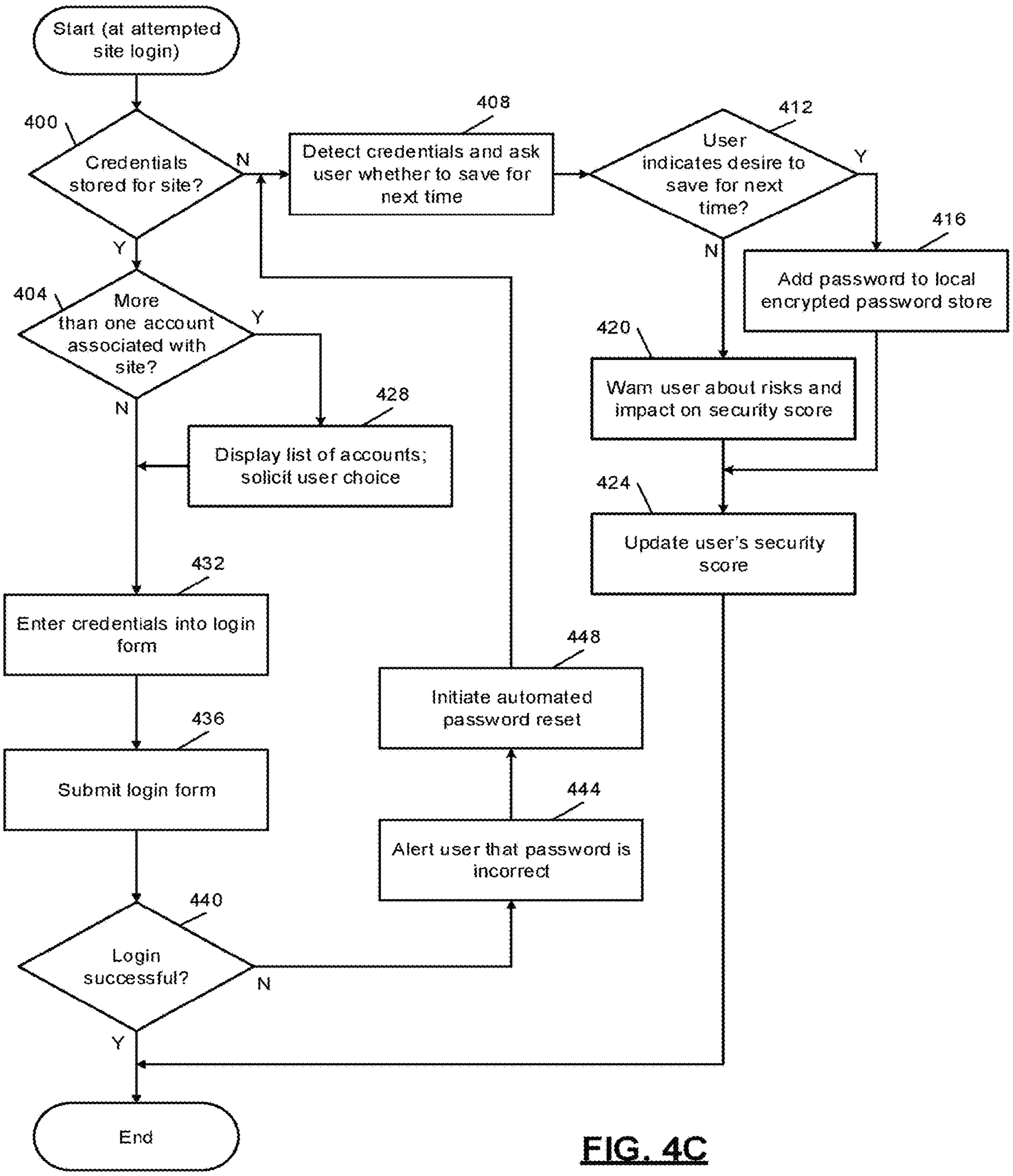
FIG. 4C is a flowchart of example operation password management features.

FIG. 4C shows an example password management operation. In FIG. 4C, control begins when login to a particular site is attempted. Before the login is attempted, control may recognize the site as a login page, and store and/or update metadata for the page based on operations explained herein relative to FIGS. 4A and 4B.

At 400, control determines whether credentials are stored for the site. If so, control transfers to 404; otherwise, control transfers to 408. At 408, control detects credentials and asks the user whether to save them for the next time. For example, these credentials may be hand typed by the user or may be obtained from a password store of the browser. This process may assist in the onboarding of a new user, such that over time their credentials are learned by the system without having to determine an extract-transform-load process to port existing passwords over to the security system of the present disclosure.

Control continues at 412, where if the user has indicated a desire to save the credentials for the next time, control transfers to 416; otherwise, control transfers to 420. At 416, control adds the password to the local encrypted password store and may remove the password from the browser password manager. Control continues at 424. At 420, control warns the user about the risks of not saving the credentials and its potential impact on the user's security score. Control continues at 424. In addition, at 420, control may offer the user the opportunity to change their mind. If the user indicates a willingness to change their mind, control transfers to 416. At 424, control updates the user's security score and ends.

At 404, if more than one account is associated with the site, control transfers to 428; otherwise, control transfers to 432. At 428, control displays a list of accounts and solicits the user's choice between the accounts. Once a selection from the accounts is made, control continues at 432. At 432, control enters the credentials into the login form. Control then automatically submits the login form to avoid additional demands on the user at 436, and transfers to 440.

At 440, control determines whether the login was successful. If so, control ends; otherwise, control transfers to 444. At 444, control alerts the user that the password was incorrect. At 448, an optional step may be conducted of initiating an automated password reset. For example, UI automation may be used to navigate to and enter a username and click a forgot password link based on stored metadata. This may initiate an email being sent to the user. Then control continues at 408 where the user's new password can be stored. In such implementations, 408 may also include the ability to generate a password for the site. As described above, the password may be generated based on metadata indicating the required elements of the password for that specific site.

Figure 5:
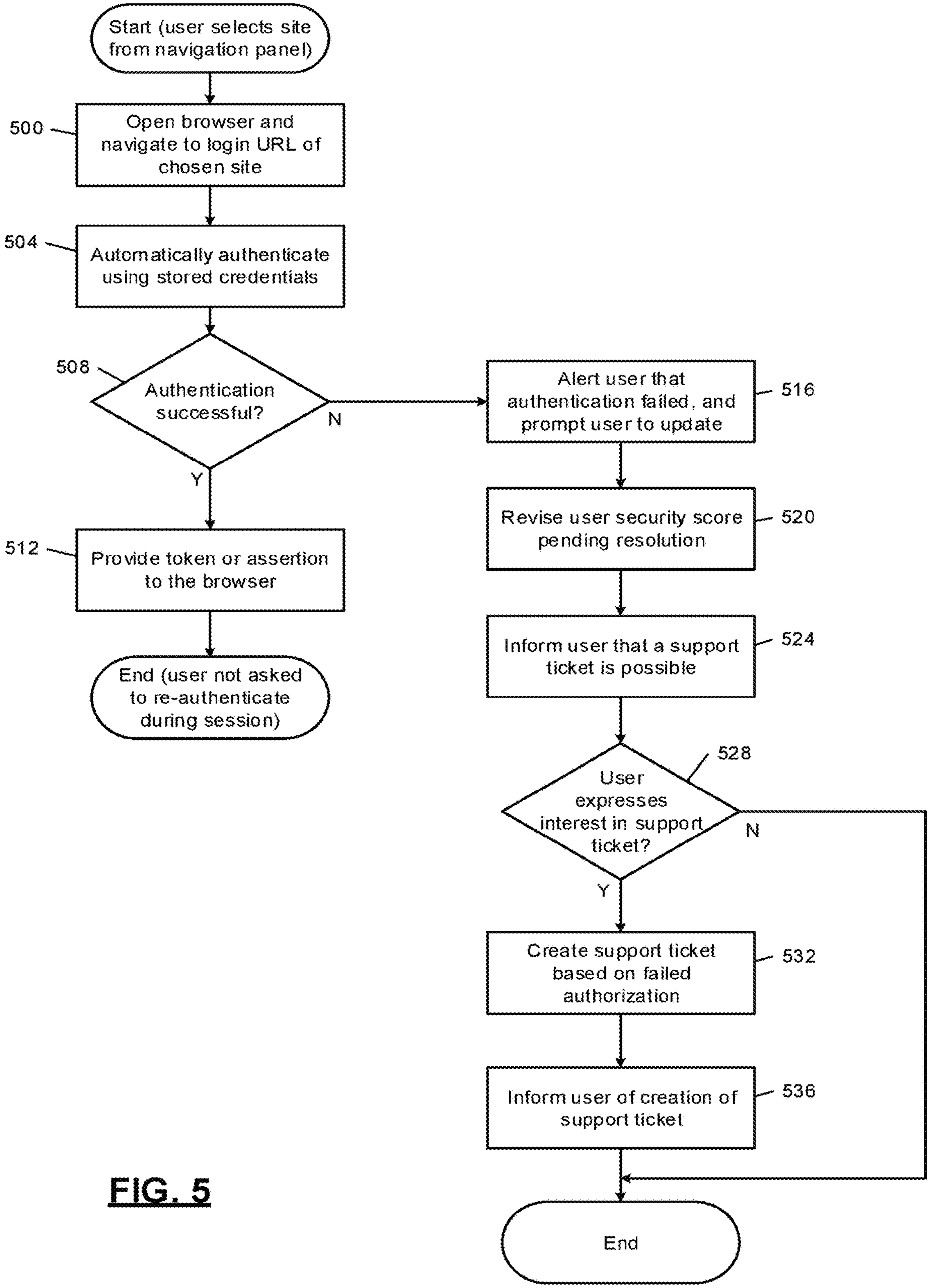
FIG. 5 is a flowchart of an example single sign-on operation.

In FIG. 5, a single sign-on use model of a password manager is described. Control begins at 500 once the user has authenticated to the single sign-on system and selected a desired website from a navigation panel of the single sign-on system. At 500, control opens a browser (e.g., a headless browser) and navigates to the login URL of the chosen site. Control may navigate to the login URL based on a previous URL categorization as explained herein. At 504, control automatically authenticates to the chosen site using stored credentials. For example, these credentials can be supplied directly to the login form which is then automatically submitted to the site.

In this way, not only does the user not need to recall or type the password, but does not even need to interact with the authentication process at all. In fact, the authentication may be performed behind the scenes using a headless browser and the stored cookie can then be transferred to the interactive browser of the user. In other implementations, a progress indicator may be shown to the user while the authentication to the website is being performed behind the scenes.

At 508, if the authentication is successful, control transfers to 512; otherwise, control transfers to 516. At 512, the website provides a token or an assertion or a cookie to the browser. The user is then not asked to re-authenticate during the current session and control ends. At 516, control alerts the user that authentication failed and prompts them to update the credentials.

Control then proceeds to 520, where control may revise the user's security score pending resolution of the failed authentication. At 524, control informs the user that creating a support ticket is possible. At 528, if the user expresses an interest in the support ticket, control transfers to 532; otherwise, control ends. Control creates a support ticket based on the failed authentication at 532, informs the user of the creation of the support ticket at 536, and then ends.

Figure 6:
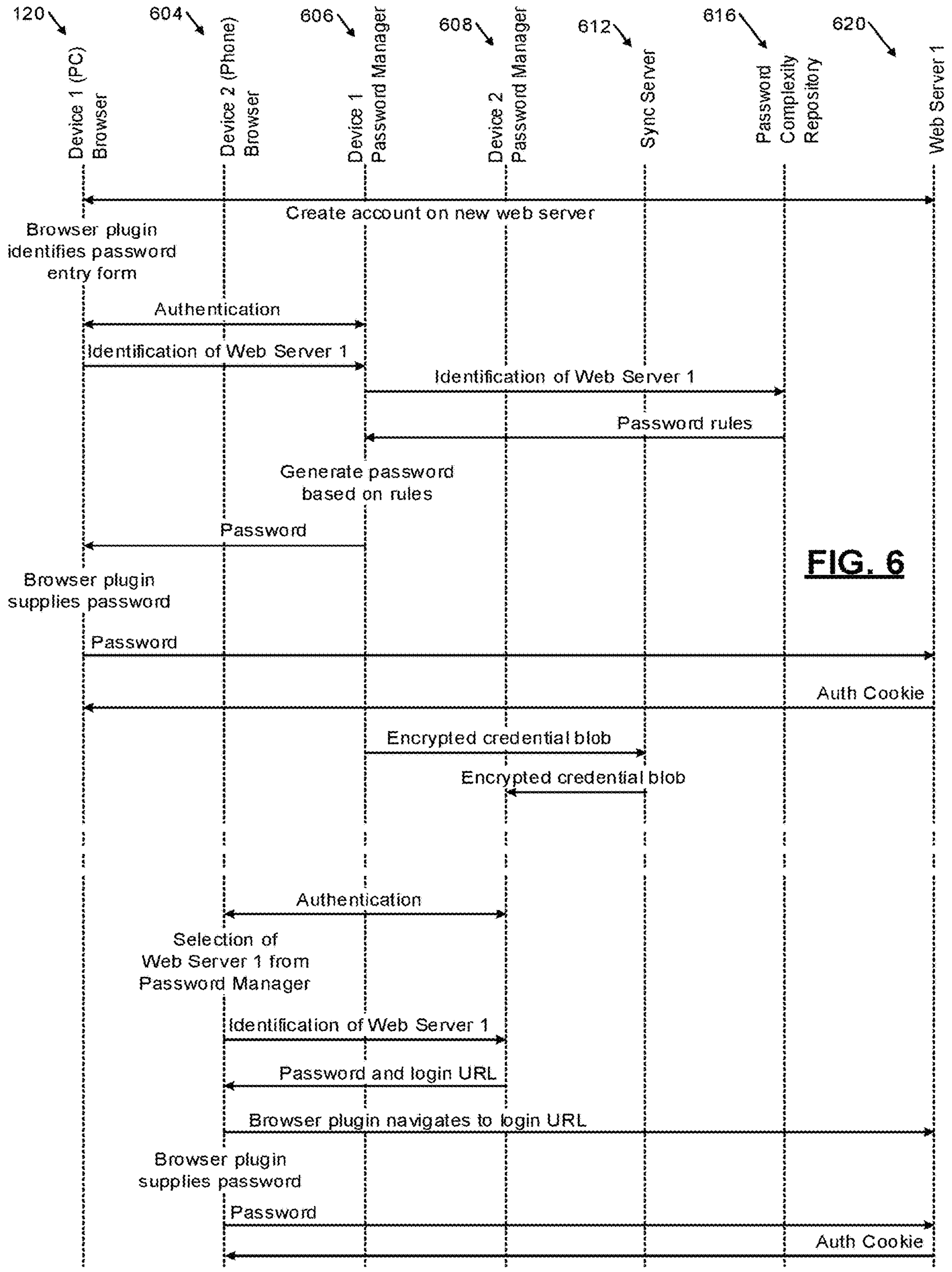
FIG. 6 is a message sequence chart of an example single sign-on operation.

In FIG. 6, a simple message sequence chart of single sign-on across multiple devices is shown. The components of the message sequence chart include the browser 120 of the client device 104, a browser 604 of the client mobile device 108, a password manager 606 of the client device 104, such as the password management module 140, a password manager 608 of the client mobile device 108, a synchronization server 612 such as the encrypted credential store 164, a password complexity repository 616 such as the website metadata database 168, and a web server 620, which may be one of the web servers 116.

Using the browser 120, a user may begin the account creation process on the web server 620. A browser plugin (such as the plugin 128), which may also be referred to as a browser extension, identifies a password entry form and initiates the password manager 606. The user authenticates to the password manager 606, either directly using a GUI, or via the browser 120, such as using the plugin.

The browser 120 then provides identification of the web server 620 to the password manager 606. This identification is sent from the password manager 606 to the password complexity repository 616, which responds with password rules for the web server 620. The password manager 606 generates a password based on the obtained rules and provides that password back to the browser 120. Again, interactions between the password manager 606 and the browser 120 may be performed via the browser plugin.

The browser plugin then supplies the password to a web form, which is transmitted via HTTPS to the web server 620. The web server 620 responds with some identifier of the authentication, such as a cookie. The user can then use the services offered by the web server 620. At some point after the password has been generated, the password manager 606 provides an encrypted blob of the credentials to the synchronization server 612. The synchronization server 612 then passes the encrypted credential blob down to the password manager 608 to make the passwords available to the of the client mobile device 108.

At some later point in time (this potential time delay being indicated by the broken lines), the user employs the browser 604 of the client mobile device 108 and authenticates to the password manager 608. Once authentication is performed, the sites managed by the password manager 608 are available to the user. The user may select the web server 620 from the password manager 608 and a verification is sent to the password manager 608.

The password manager 608 supplies the password and login URL to the browser 604, again using a plugin or a custom browser that is capable of communicating with the password manager 608. The browser plugin navigates to the login URL of the web server 620, and supplies the password into a form that is then transmitted to the web server 620. In various implementations, a username may also be supplied. For example, the username may only need to be supplied to the web server 620 the first time that the user authenticates to the web server 620 from a particular device. The web server 620 then returns and authentication identifier, such as a cookie, to the browser 604.

Figure 7:
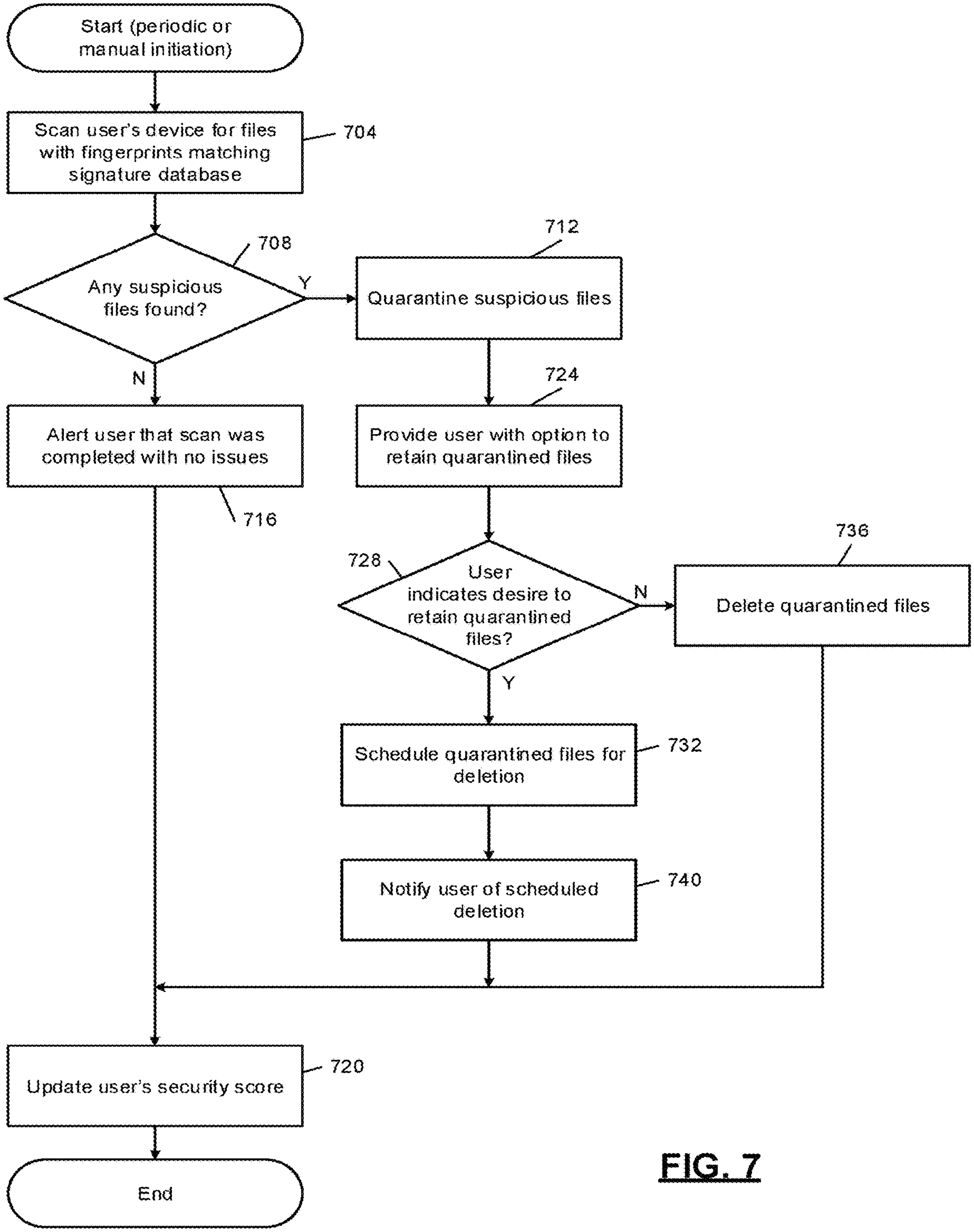
FIG. 7 is a flowchart of an example antivirus operation.

FIG. 7 shows an example antivirus operation. In FIG. 7, a scan by an endpoint protection module such as the module 156 of FIG. 1 may be initiated periodically or manually by the user or by, for example, a champion helping the user to increase his/her score. Control begins at 704, where control scans the user's device for files with fingerprints matching a signature database. At 708, if any matching documents are found, these may be considered suspicious and control transfers to 712. If no suspicious files are found, control transfers to 716. At 716, control alerts the user that the scan was completed with no issues and continues at 720. At 720, control updates the user security score, which may depend on how recently a scan has been performed. Control then ends.

Control quarantines the suspicious files at 712, and provides the user with an option to retain quarantine files rather than immediately deleting them at 724. Control then continues to 728, where control determines whether the user has indicated a desire to retain the quarantined files. If so, control transfers to 732; otherwise, control transfers to 736. At 736, control deletes the quarantined files and continues at 720. At 732, control schedules the quarantined files for deletion. In addition, the quarantined files or a fingerprint of them (such as a crutch graphic cache) may be uploaded for analysis. This may be especially helpful for identifying false positives. At 740, control notifies the user of the scheduled deletion and continues at 720.

Figure 8A:
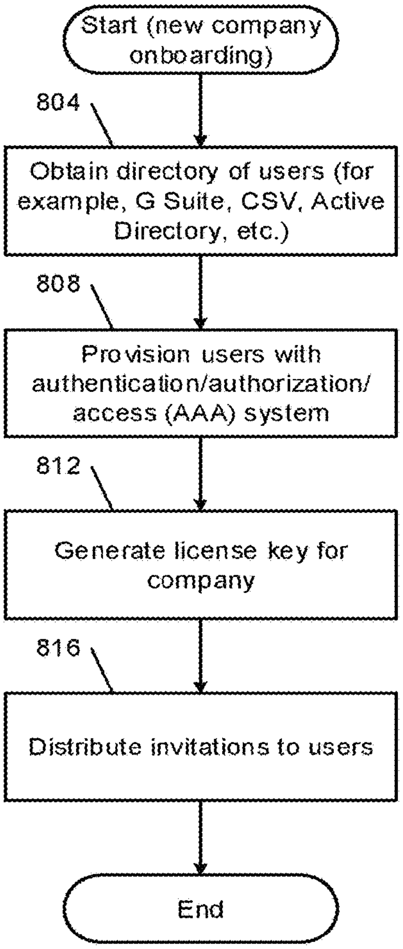
FIG. 8A is a flowchart of an example onboarding of a new company to a security system of the present disclosure.

FIG. 8A shows an example onboarding operation for a new company. In FIG. 8A, control of the example operation begins at 804, where control obtains a directory of users, including user names, email addresses, etc. For example, the directory may be obtained from GC by Google Inc., an active directory server, a comma-separated value (CSV) file, etc. At 808, control provisions users with an authentication/authorization/access (AAA) system maintained by or maintained for the operator of the security system. At 812, control generates license key for the onboarding company. At 816, control distributes invitations to users at the company. For example, these invitations may be sent by email from the directory of users.

Figure 8B:
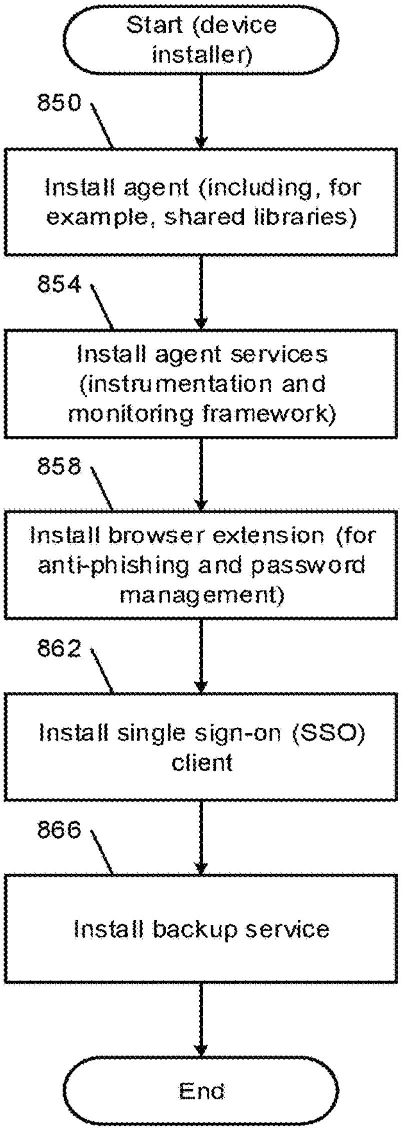
FIG. 8B is a flowchart of an example installation operation for a device being onboarded to the security system of the present disclosure.

FIG. 8B shows an example onboarding operation for a device. In FIG. 8B, the example operation begins at 850, where control installs an agent on the device. This agent may include shared libraries. In various implementations, this agent may take the form of an executable from a closed store such as the APP STORE from Apple Inc. In other implementations, such as for computers running versions of the WINDOWS operating system from Microsoft Inc., the agent may be downloaded directory directly from a URL included in an email to the user.

At 854, control installs agent services on the device, which may include an instrumentation and monitoring framework. When possible, the instrumentation and monitoring framework accesses hardware-level parameters such as memory usage and processor utilization. At 858, control installs a browser extension or plugin, which may offer anti-phishing and password management features as explained herein. At 862, control installs a single sign-on client, which may be a graphical user interface (GUI) for the password management system. At 866, control installs a backup service, which may backup aspects of the security infrastructure as well as other data on the device. Control then ends.

Figure 9:
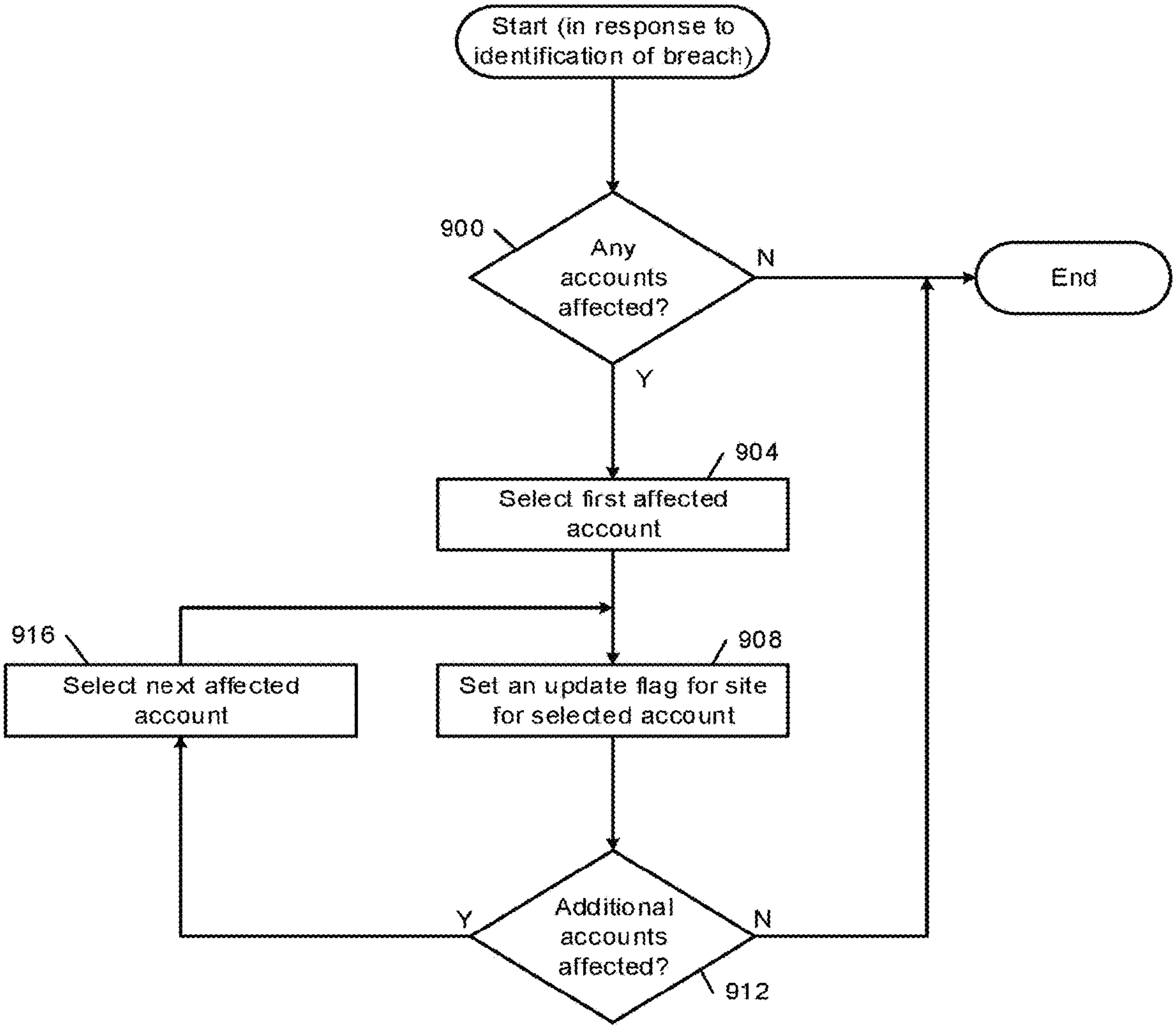
FIG. 9 is a flowchart of example operation for setting a password update flag based a website breach.
Figure 10A:
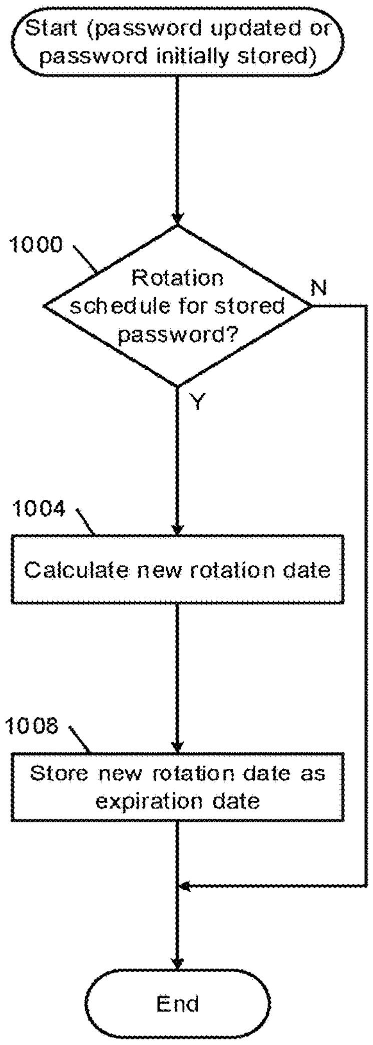
FIG. 10A is a flowchart of example operation for determining a password expiration date.
Figure 10B:
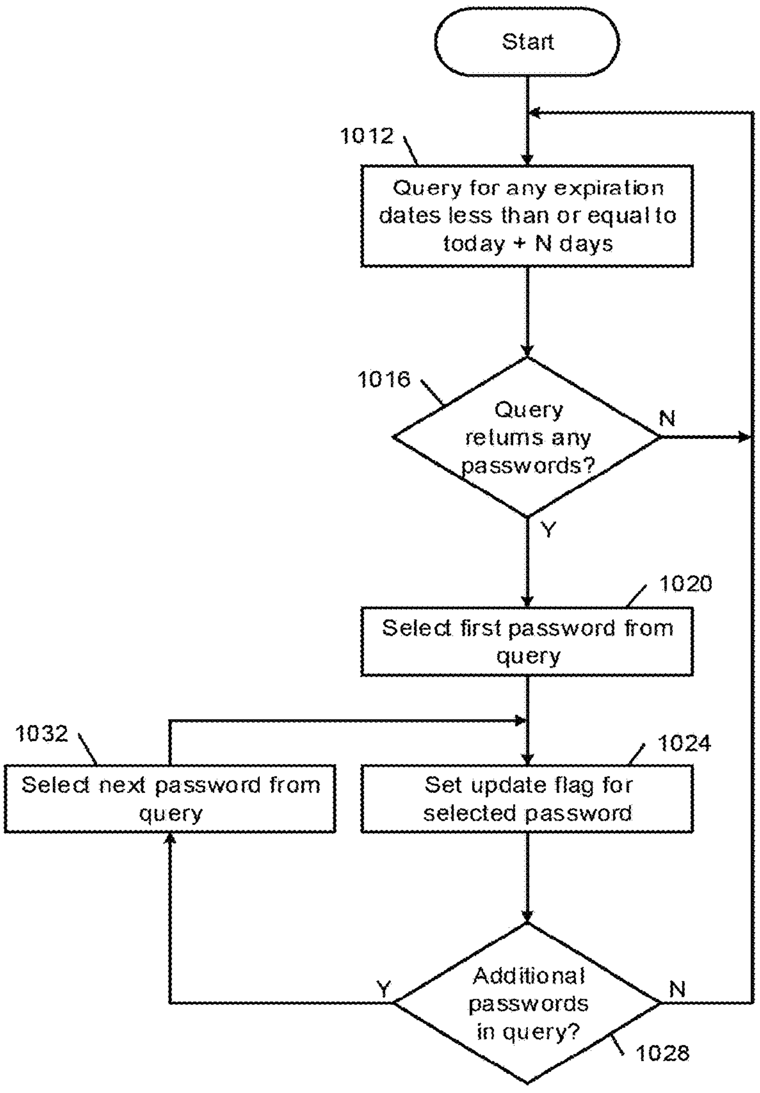
FIG. 10B is a flowchart of example operation for setting a password update flag based on a password expiration date.
Figure 11:
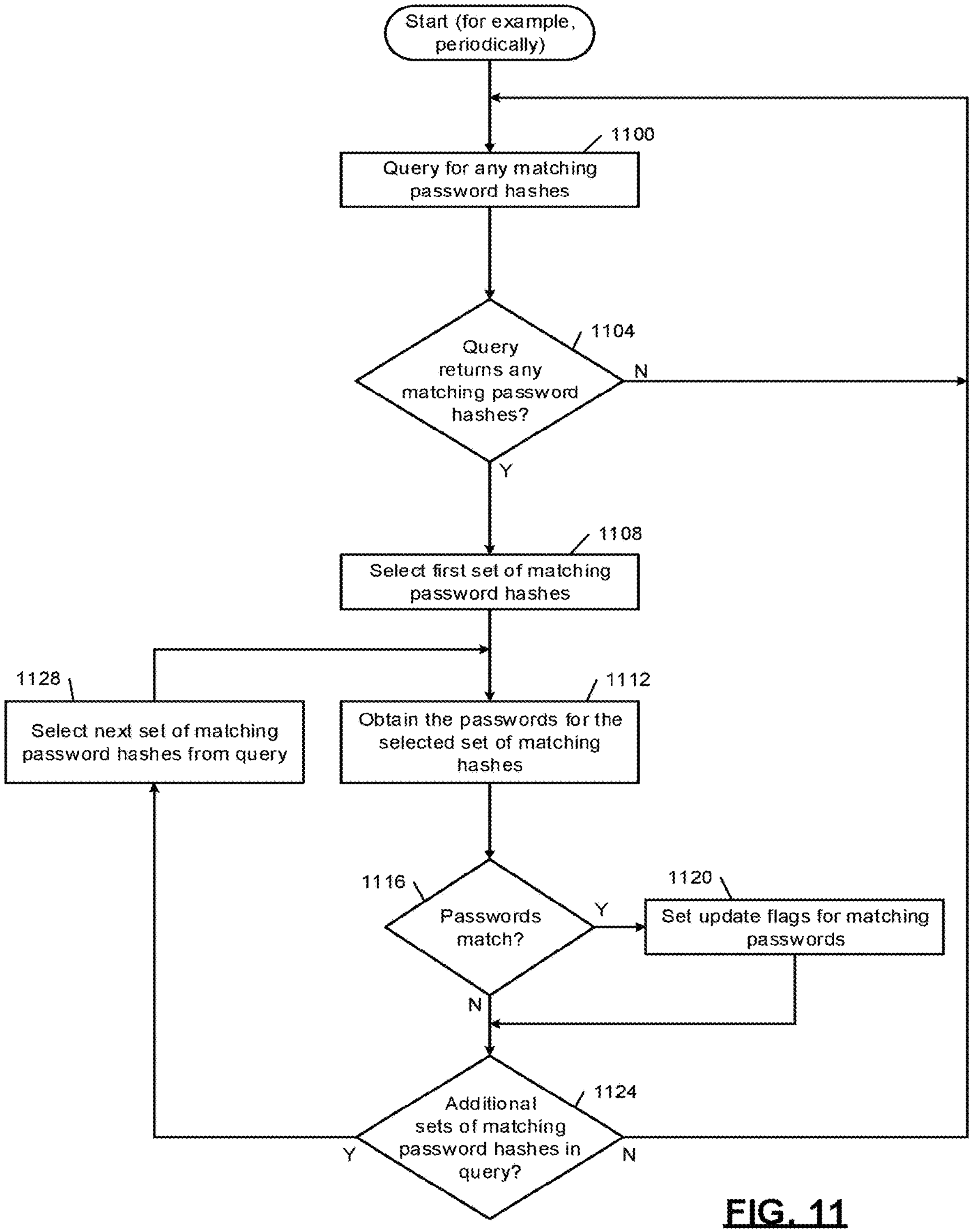
FIG. 11 is a flowchart of example operation for setting password update flags when matchings passwords are identified.
Figure 12:
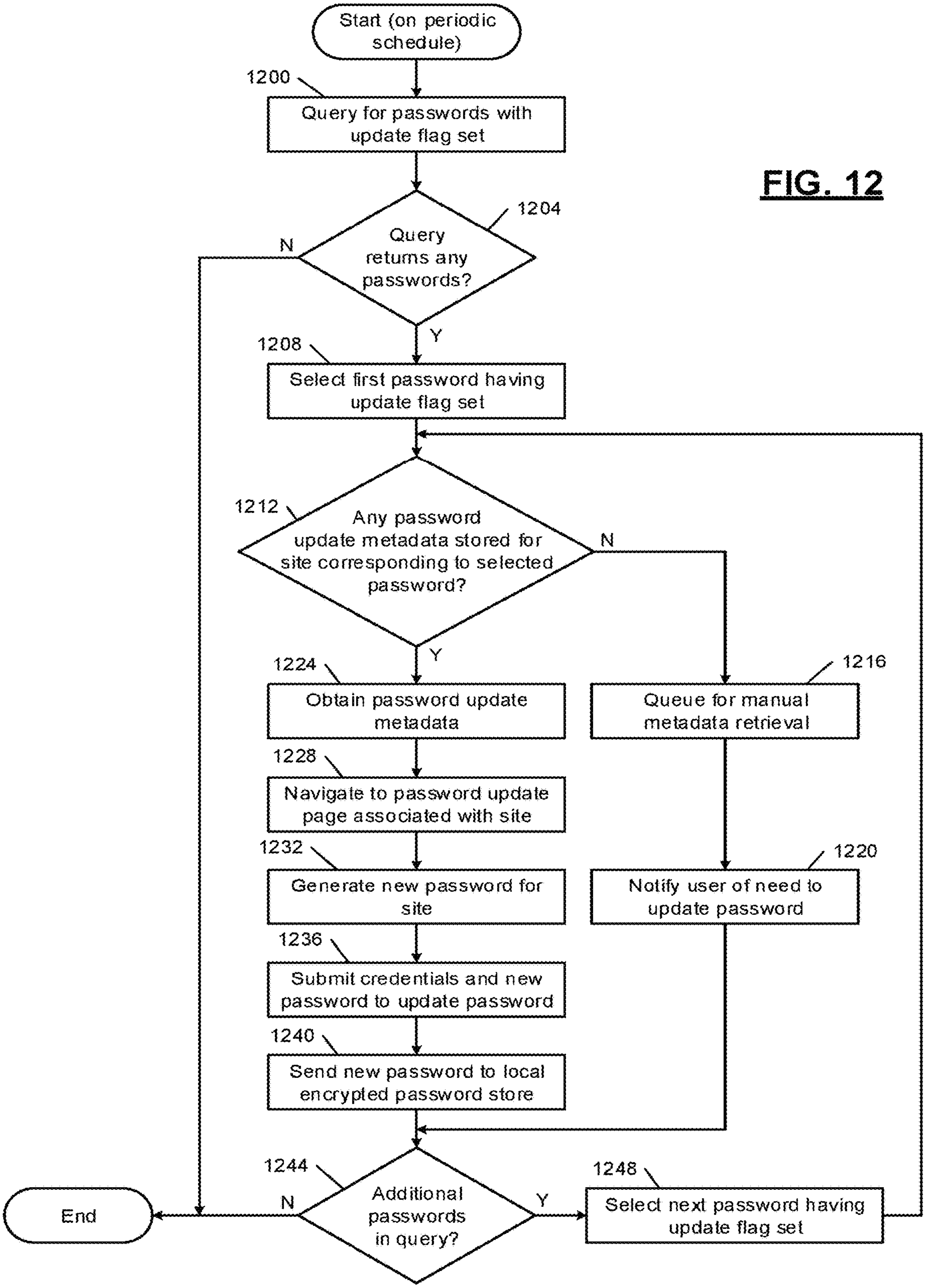
FIG. 12 a flowchart of an example password update operation.

In FIGS. 9-12, example password update operations are shown. For example, operations for setting password update flags in response to particular events such as a data breach, an elapsed period of time, and matching passwords are shown in FIGS. 9-11, and an operation for updating passwords in response to set update flags is shown in FIG. 12. Although update flags are set based on specific events in FIGS. 9-12, it should be appreciated that other suitable events may also trigger the setting of password update flags.

In FIG. 9, control begins in response to an identification of a website breach. For example, control may identify a breach based on input from a champion and/or a user, data from one or more third party services (e.g., websites such as https://haveibeenpwned.com/), etc.

Control begins at 900, where control determines whether any accounts associated with the security system have been affected due to a website breach. For example, control may determine if any login information (e.g., usernames, email addresses, passwords, etc.) of a user associated with the security system have been affected based on received input from a champion and/or a user, collected data from a third party service, etc. If so, control transfers to 904; otherwise, control ends.

At 904, control selects an affected account (e.g., the first affected account). In some implementations, control may select the affected account from a returned query. Control then proceeds to 908, where control sets an update flag for a password of the selected account associated with the site.

Control then proceeds to 912, where control determines whether any additional accounts (e.g., from the returned query) have been affected. If so, control transfers to 916; otherwise, control ends. At 916, control selects another affected account (e.g., the next affected account). Control then returns to 908 to set another update flag.

While FIG. 9 shows this process for demonstration purposes only as iterative and serial, in various implementations the process may be conducted partially or fully in parallel. For any repeating process shown in this application, the process may be performed in parallel by dividing the process up between threads, processors, machines, etc. In various implementations a single operation may be able to perform multiple operations. For example, an update flag may be set for multiple accounts at once using a single structured query language (SQL) command. Further, unless otherwise indicated, the order may not matter. In other words, the parallelized process may execute individual operations in a different order than a serial process.

FIGS. 10A and 10B show example operations for setting an expiration date for a stored password, and setting a password update flag based on the expiration date. In the example of FIG. 10A, the operation for setting the expiration date may occur for each stored password.

In FIG. 10A, control begins in response to a stored password being updated or a password being initially stored. At 1000, control begins by determining whether a rotation schedule for a stored password exists. If so, control transfers to 1004; otherwise, control ends. In some implementations, control may notify a champion, an administrator of the security system, etc. and/or set a rotation schedule in response to determining that no rotation schedule exists for the stored password.

At 1004, control calculates a new rotation date for the stored password. The new rotation date may be a defined number of days after the stored password was last updated, a defined number of days after the password being initially stored, or another suitable future date. In some examples, the defined number of days may be 5 days, 10 days, 15 days, etc. Control then proceeds to 1008, where control stores the new rotation data as an expiration date for the password.

In FIG. 10B, control begins at 1012, where control queries for any stored expiration dates less than or equal to today+N days. For example, N may be any suitable positive integer such as a number greater than two. At 1016, control determines whether the query returned any stored passwords having an expiration date less than or equal to today+N days. If so, control transfers to 1020; otherwise, control returns to 1012. At 1020, control selects a stored password (e.g., a first stored password) from the query. Control then sets an update flag for the selected password at 1024, and proceeds to 1028.

At 1028, control determines whether the query returned any additional stored password having an expiration date less than or equal to today+N days. If so, control transfers to 1032; otherwise, control returns to 1012. At 1032, control selects another stored password (e.g., the next stored password) from the query. Control then returns to 1024 to set an update flag for that selected password.

FIG. 11 shows example operation for identifying and remediating matching passwords. In various implementations, the system checks for two or more matching passwords used by a single user for different websites, which increases the risk that a breach revealing one site's password can be leveraged to gain access to another site. In various implementations, the system may also check for matching passwords used by multiple users, either for the same or different websites. Passwords that match between users is an indication of undesirable password sharing or of generally weak passwords.

In various implementations, a hashed form of the stored passwords is used as much as possible, to use the actual passwords in as few situations as possible. The fewer systems that have access to plaintext passwords, and the fewer times plaintext passwords are extracted, the less likely it is for a security breach to obtain any passwords in plaintext.

In FIG. 11, control begins at 1100, where control queries for any matching password hashes. At 1104, control determines whether the query returned any matching password hashes. If so, control transfers to 1108; otherwise, control returns to 1100. At 1108, control selects a set of matching password hashes (e.g., the first set of matching password hashes) from the query.

At 1112, control obtains the passwords for the selected set of matching password hashes. At 1116, control determines whether the passwords from the hashes match. If so, control transfers to 1120; otherwise, control transfers to 1124. In various implementations, 1112 may be performed in a secured area, such as within a hardware security module (HSM), so that the system performing the remainder of FIG. 11 never obtains plaintext passwords. Instead, the system performing the remainder of FIG. 11 identifies the passwords of interest to the HSM and the HSM provides a Boolean value indicating whether the passwords match or not.

At 1120, control sets update flags for the matching passwords, and proceeds to 1124. For example, control may set update flags for all of the matching passwords from the hashes. In other examples, control may set update flags for a portion of the matching passwords from the hashes. For example, control may select N−1 of the matching passwords (where N is the total number of matching passwords), and set update flags for the selected matching passwords. In such examples, an update flag would not be set for one of the matching passwords.

At 1124, control determines whether the query returned any additional sets of matching password hashes. If so, control transfers to 1128; otherwise, control returns to 1100. At 1128, control selects another set of matching password hashes (e.g., the next set of matching password hashes) from the query. Control then returns to 1112 to obtain the passwords for that selected set of matching password hashes.

FIG. 12 shows example operation for updating passwords based on set update flags such as the update flags explained herein relative to FIGS. 9-11. Portions of or the entire example operation of FIG. 12 may be implemented on a client device such as the client device 104 of FIG. 1 or a security server such as the security server 100 of FIG. 1.

In FIG. 12, control may begin on a periodic schedule. For example, the operation of FIG. 12 may begin each night, every twelve hours, every six hours, etc. In some examples, the operation of FIG. 12 may be initiated on-demand if, for example, a breach is detected. At 1200 of FIG. 12, control begins by querying for any password with an update flag set. At 1204, control determines whether the query returned any passwords. If so, control transfers to 1208; otherwise, control ends. At 1208, control selects a password (e.g., the first password) having an update flag set from the query. In some examples, control may sort the passwords from the query by priority. For example, control may sort the passwords affected by a breach as a higher priority than matching passwords. In such examples, control may select the password(s) affected by the breach (e.g., a high security threat) first.

Control then proceeds to 1212, where control determines whether any password update metadata is stored for the website corresponding to the selected password. For example, metadata for a password update page may be captured and stored in the website metadata database 168 of FIG. 1, as explained herein relative to FIG. 4B. In other examples, the metadata for the password update page may be manually retrieved (e.g., manually captured) and stored. If no metadata for a password update page is stored, control queues for manual metadata retrieval at 1216, notifies the user of a need to update his/her password for the site at 1220, and then proceeds to 1244. The notification of 1220 may be conditional upon how recently a prior notification was sent to a user. For example, if a notification for any password has been sent within 24 hours, the notification may be delayed until the 24-hour period has elapsed, or may be discarded, relying on the next round of notifications to be sent to the user. In various implementations, a delayed notification may be batched with other notifications and sent together to minimize interruption to the user.

As such, a champion and/or another person associated with the security system may be notified to manually retrieve metadata for the password update page of the website. Additionally, before such metadata is manually retrieved, the user may update his/her password in response to receiving the notification.

If password update metadata is stored for the website corresponding to the selected password at 1212, control obtains the password update metadata at 1224 and navigates to the password update page associated with the website at 1228. For example, control may employ a stored URL for the password update page (e.g., from the stored metadata) to navigate to the page without user interaction.

At 1232, control generates a new password for the website. For example, the new password may be generated by the server 100 of FIG. 1 based on metadata stored in the website metadata database 168 associated with the server 100. In other examples, the new password may be generated by the password management module 140 of FIG. 1 based on metadata stored in a database on the client device 104, a database associated with the server 100, etc.

At 1236, control submits credentials and the newly generated password to update the password for the website. The credentials may include, for example, stored information such as the user's email address, the old password for the site, answers to security questions, etc. Next, control sends the new password to a local encrypted password store at 1240. For example, control may send the new password to the encrypted credential database 144.

Control then proceeds to 1244, where control determines whether the query returned any additional passwords with an update flag set. If so, control transfers to 1248; otherwise, control ends. At 1248, control selects another password (e.g., the next password) having an update flag set. Control then returns to 1212 to determine whether any password update metadata is stored for the website corresponding to that selected password.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. The phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for protecting an endpoint device of a user, the system comprising:

- a web interface module installed on the endpoint device and configured to identify (i) a present uniform resource locator (URL) visited by the user and (ii) target URLs to which navigation is available;
- a password management module installed on the endpoint device and configured to:
  - store a plurality of entries, wherein a first entry of the plurality of entries includes a first username, a first password, and a first login URL; and
  - selectively supply credentials to the web interface module, including supplying the first password to the web interface module in response to the web interface module identifying the first login URL as the present URL; and a URL analysis module configured to evaluate the target URLs to classify each of the target URLs as either safe or suspicious and to initiate a warning to the user in response to one of the target URLs being classified as suspicious, wherein the URL analysis module performs the classification based in part on login URLs stored by the password management module.

2. The system of claim 1 further comprising an artificial intelligence engine configured to analyze speech received by a microphone of the endpoint device and identify a corresponding action based on the analyzed speech.

3. The system of claim 2 wherein the corresponding action is selected from at least one of:

a set of automated solutions configured to be executed on the endpoint device;

a set of knowledge base articles configured to be displayed to the user; and generation of a service ticket.

4. The system of claim 3 wherein the artificial intelligence engine is configured to:

determine whether the analyzed speech corresponds to one of the set of automated solutions;

in response to determining that the analyzed speech does not correspond to one of the set of automated solutions, determine whether the analyzed speech corresponds to one of the set of knowledge base articles; and in response to determining that the analyzed speech does not correspond to one of the set of knowledge base articles, propose generation of the service ticket to the user.

5. The system of claim 2 wherein at least some of the speech analysis is performed at a device physically remote from the endpoint device.

6. The system of claim 1 wherein the URL analysis module is configured to input a first target URL of the target URLs into a machine learning (ML) model and classify the first target URL as safe or suspicious based on an output of the ML model.

7. The system of claim 6 wherein the ML model is trained based at least on data that is specific to the user.

8. The system of claim 6 wherein data that is specific to the user includes the login URLs stored by the password management module.

9. The system of claim 1 wherein the web interface module is configured to select a first URL from a rendered web page of the present URL for provision to the URL analysis module as one of the target URLs.

10. The system of claim 9 wherein the web interface module is configured to select a URL specified by a hyperlink as the first URL in response to a user indication of intent to activate the hyperlink.

11. The system of claim 10 wherein the web interface module is configured to interpret hovering a mouse cursor over the hyperlink as an indication of intent to activate the hyperlink.

12. The system of claim 1 wherein the web interface module is configured to:

identify a most visually prominent hyperlink from a rendered web page of the present URL and provide a URL within the most visually prominent hyperlink to the URL analysis module as one of the target URLs.

13. The system of claim 1 wherein the password management module is configured to programmatically update the first password using a headless browser executing on the endpoint device.

14. The system of claim 1 wherein the password management module is configured to programmatically update the first password in response to receiving a set password update flag.

15. The system of claim 1 wherein the password management module is configured to randomly generate a new password for a web service identified by the first login URL.

16. The system of claim 15 wherein:

the password management module is configured to generate the new password based on a set of rules specific to the web service; and the set of rules specifies at least one of:

minimum length of the new password, maximum length of the new password, acceptable characters for use in creating the new password, unacceptable characters for use in creating the new password, and required character sets for use in creating the new password.

17. The system of claim 1 further comprising a data collection module configured to collect telemetry data about the endpoint device, wherein the telemetry data includes a list of installed programs and a plurality of metrics including memory usage and processor utilization.

18. The system of claim 1 wherein the web interface module comprises a plugin for a browser installed on the endpoint device.

19. The system of claim 1 wherein:

the URL analysis module is configured to input identifying information of a web page associated with a URL, and categorize the URL as one of a plurality of defined web pages based on an output of a machine learning (ML) model; and the plurality of defined web pages include at least one of a login web page and a password update web page.

20. A method for protecting an endpoint device of a user, the method comprising:

by a web interface module installed on the endpoint device, identifying (i) a present uniform resource locator (URL) visited by the user and (ii) target URLs to which navigation is available;

by a password management module installed on the endpoint device:

storing a plurality of entries, wherein a first entry of the plurality of entries includes a first username, a first password, and a first login URL; and selectively supplying credentials to the web interface module, including supplying the first password to the web interface module in response to the web interface module identifying the first login URL as the present URL;

evaluating the target URLs to classify each of the target URLs as either safe or suspicious;

outputting a warning to the user in response to one of the target URLs being classified as suspicious; and performing the classification based in part on login URLs stored by the password management module.

* * * * *